US011293725B2

(12) United States Patent
Campbell et al.

(10) Patent No.: US 11,293,725 B2
(45) Date of Patent: Apr. 5, 2022

(54) METHOD, SYSTEM AND APPARATUS FOR ILLUMINATING TARGETS USING FIXED, DISPOSABLE, SELF-HEALING REFLECTIVE LIGHT DIFFUSION SYSTEMS

(71) Applicant: Advanced Target Technologies IP Holdings Inc., Dover, DE (US)

(72) Inventors: Mark Campbell, Santa Clarita, CA (US); Michael Campbell, Valencia, CA (US); Jonathan Wharrad, Worcestershire (GB); David Wharrad, Leicestershire (GB)

(73) Assignee: Advanced Target Technologies IP Holdings Inc., Dover, DE (US)

( * ) Notice: Subject to any disclaimer, the term of this patent is extended or adjusted under 35 U.S.C. 154(b) by 0 days.

(21) Appl. No.: 16/628,815

(22) PCT Filed: Jul. 6, 2018

(86) PCT No.: PCT/GB2018/051933
§ 371 (c)(1),
(2) Date: Jan. 6, 2020

(87) PCT Pub. No.: WO2019/020971
PCT Pub. Date: Jan. 31, 2019

(65) Prior Publication Data
US 2020/0132420 A1 Apr. 30, 2020

Related U.S. Application Data

(60) Provisional application No. 62/604,537, filed on Jul. 11, 2017.

(51) Int. Cl.
*F41J 5/14* (2006.01)
*G02B 5/04* (2006.01)

(52) U.S. Cl.
CPC .. *F41J 5/14* (2013.01); *G02B 5/04* (2013.01)

(58) Field of Classification Search
CPC . F41J 5/04–06; F41J 5/14; G02B 5/04; G02B 6/29307; G02B 6/2931–29311
(Continued)

(56) References Cited

U.S. PATENT DOCUMENTS 3,034,788 A * 5/1962 Cauble ................. F41J 7/06
273/408
3,516,670 A * 6/1970 Brieff .................. F41J 1/01
273/372
(Continued)

FOREIGN PATENT DOCUMENTS

EP 1342979 A1 * 9/2003 ............... F41J 5/02
EP 1342979 A1 9/2003
(Continued)

OTHER PUBLICATIONS

European Patent Office, Written Opinion of the International Searching Authority, for PCT/GB2018/051933, dated Oct. 9, 2018.
(Continued)

*Primary Examiner* — Laura Davison
(74) *Attorney, Agent, or Firm* — Wiggin and Dana LLP; Gregory S. Rosenblatt; Brian A. Pattengale

(57) ABSTRACT

The present invention relates to a partial or fully self-healing illumination system connected to or directly on a shooting target used for practice, competition, or qualification. More specifically, this invention relates to a system that uses a light and a self-healing reflector configured to project light towards the shooter while allowing partial or full pass-through projectile strikes.

12 Claims, 20 Drawing Sheets

(58) Field of Classification Search
USPC .......................................................... 273/403
See application file for complete search history.

(56) References Cited

U.S. PATENT DOCUMENTS

| | | | | |
|---|---|---|---|---|
| 3,682,478 | A | * | 8/1972 | Knight ...................... F41J 1/10 273/408 |
| 3,778,169 | A | | 12/1973 | Adams |
| 4,524,976 | A | | 6/1985 | Seitz et al. |
| 4,979,752 | A | | 12/1990 | Fosseen |
| 5,263,722 | A | | 11/1993 | Rosellen |
| 5,575,479 | A | | 11/1996 | Ayres |
| 5,597,164 | A | * | 1/1997 | Dodds ...................... F41J 5/04 273/371 |
| 5,934,678 | A | * | 8/1999 | Theissen ................... F41J 7/06 273/386 |
| 7,114,725 | B2 | | 10/2006 | Camp et al. |
| 7,175,181 | B1 | | 2/2007 | Bateman et al. |
| 7,661,679 | B2 | | 2/2010 | Mah et al. |
| 8,356,818 | B2 | * | 1/2013 | Mraz ...................... F41J 5/041 273/371 |
| 8,523,185 | B1 | * | 9/2013 | Gilbreath .................. F41J 5/06 273/371 |
| 8,545,226 | B2 | | 10/2013 | Norden et al. |
| 8,561,993 | B2 | * | 10/2013 | Preston ..................... F41J 7/06 273/372 |
| 8,814,168 | B2 | | 8/2014 | Davis |
| 8,915,118 | B2 | | 12/2014 | Russell et al. |
| 9,004,490 | B2 | | 4/2015 | Kazakov et al. |
| 9,157,706 | B2 | | 10/2015 | Shea |
| 9,163,912 | B1 | | 10/2015 | Stark |
| 9,170,077 | B2 | | 10/2015 | Johnson et al. |
| 9,303,959 | B2 | | 4/2016 | Doria |
| 9,303,960 | B2 | | 4/2016 | Uhr |
| 9,360,283 | B1 | | 6/2016 | Tejada et al. |
| 9,389,049 | B2 | | 7/2016 | Hoetger |
| 9,429,397 | B1 | * | 8/2016 | Hill .......................... F41J 5/06 |
| 9,612,092 | B2 | * | 4/2017 | Chester ..................... F41J 7/04 |
| 10,488,159 | B2 | | 11/2019 | Campbell et al. |
| 2002/0183141 | A1 | | 12/2002 | Ouimette et al. |
| 2005/0098954 | A1 | | 5/2005 | Stutz |
| 2008/0138024 | A1 | | 6/2008 | Parker et al. |
| 2009/0102129 | A1 | * | 4/2009 | Isoz .......................... F41J 5/06 273/372 |
| 2010/0038854 | A1 | | 2/2010 | Mraz |
| 2010/0180946 | A1 | | 7/2010 | Gruhlke et al. |
| 2011/0175293 | A1 | | 7/2011 | Brune |
| 2014/0119033 | A1 | | 5/2014 | Vasylyev |
| 2015/0062963 | A1 | | 3/2015 | Meir et al. |
| 2015/0102563 | A1 | | 4/2015 | Gwash |
| 2015/0260487 | A1 | | 9/2015 | Steil |
| 2015/0330607 | A1 | | 11/2015 | Di Trapani |
| 2016/0284910 | A1 | | 9/2016 | Bouchard et al. |
| 2017/0219320 | A1 | * | 8/2017 | Loetz, Jr. .................. F41J 5/04 |
| 2018/0202774 | A1 | * | 7/2018 | Sitzman ..................... F41J 5/24 |
| 2020/0173758 | A1 | | 6/2020 | Sitzman et al. |

FOREIGN PATENT DOCUMENTS

| | | | | |
|---|---|---|---|---|
| GB | 212892 | A | * 10/1924 | ............ G01R 11/48 |
| GB | 2212892 | A | 8/1989 | |

OTHER PUBLICATIONS

European Patent Office, International Search Report, for PCT/GB2018/051933, dated Oct. 9, 2018.

* cited by examiner

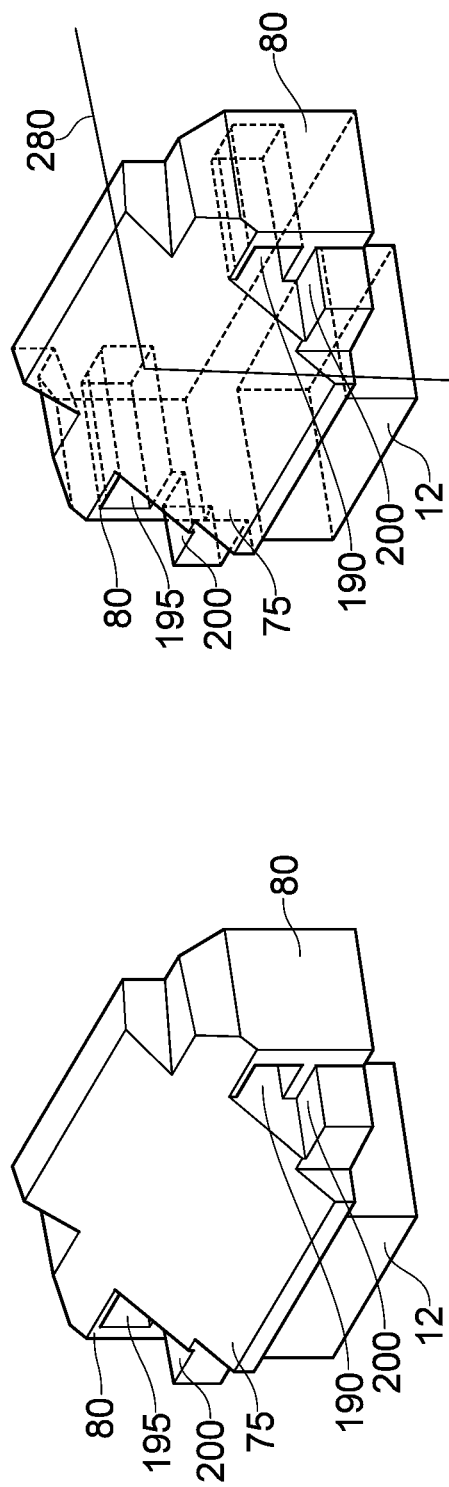
FIG. 13
FIG. 12
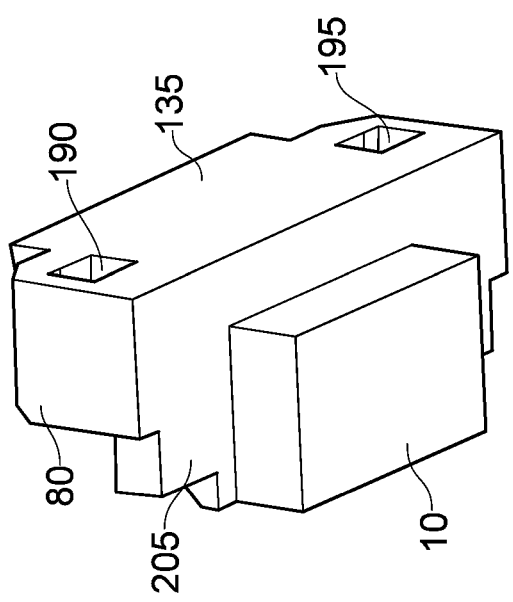
FIG. 14

METHOD, SYSTEM AND APPARATUS FOR ILLUMINATING TARGETS USING FIXED, DISPOSABLE, SELF-HEALING REFLECTIVE LIGHT DIFFUSION SYSTEMS

CROSS-REFERENCE TO RELATED APPLICATIONS

This application is a national phase entry under 35 U.S.C. § 371 of International Application PCT/GB2018/051933, filed Jul. 6, 2018, which claims the benefit under 35 U.S.C. § 119(e) of U.S. Provisional Application No. 62/604,537, filed Jul. 11, 2017, both of which are herein incorporated by reference in their entireties.

BACKGROUND OF THE INVENTION

The present invention relates to a partial or fully self-healing illumination system connected to or directly on a shooting target used for practice, competition, or qualification. More specifically, but not necessarily exclusively, this invention relates to a system that uses a light and a self-healing reflector configured to project light towards the shooter while allowing partial or full pass-through projectile strikes. Furthermore, the invention relates to an illuminable shooting target, to a target-shooting game set having more than one said illuminable shooting target, to a method of playing a target-shooting game using the shooting target, and to a method of illuminating a shooting target.

There is a need in shooting sports to add interactive illuminated feedback to the shooter or shooters as most current targetry is static in nature and provides only native feedback such as an audible ring, a plate fall, etc. Having multi-colored illuminated, software controlled feedback opens up a world of interactivity such as providing the ability of gamification for shooters to compete head-to-head, co-op, or solo. Including a lighting system that can handle the high volume bullet strikes that gamification demands is important to the experience as bullets are inherently destructive and will remove the lighting if not designed in an optimal way. Several methods of lighting have been developed including disposable lighting systems, projected systems onto diffusers with break-away reflection systems, and even fully protected systems such as LEDs directly behind polycarbonate shields, designed to take a hit. The present invention offers several advantages and improvements over the existing prior art as utilizing a self-healing material solves some of inherent flaws in the use in other approaches. A self-healing system is designed to be fixed in place, take more bullet strikes, last longer, and continue operation under one of the most extreme environments possible. Many self-healing polymers and elastomers provide a strong tear strength such that when fastened down by an area that is greater than a bullet's penetration diameter and energy, will resist breakage and remain in place during strikes allowing said projectiles to pass through. Self-healing polymers and elastomers, and even those without self-healing properties, have a natural flexible and conformable property that allows the material to tear and deform upon projectile incursion, then reform and seal or partially seal as the projectile exits the material. Self-healing polymers can add to the lifespan of the part as it mimics biological healing by reforming or fixing broken molecular bonds to restore some or all mechanical properties and geometric shapes the material had before the damage.

This design uses a projection system that bounces light off the back of a self-healing polymer with a highly reflective mirror paint applied to the back, or other similarly reflecting material that can withstand several bullet impacts. The self-healing polymer is designed to allow the bullet to pass completely through the material with minimal damage, and minimal change to the illumination color, brightness and reflective properties.

Various shooting target systems exist for delivering a form of feedback and hit location information for a shooter. The means by which these systems work vary widely and most lack a rugged, reusable, fast way of sharing automated visual feedback of a hit response from a target. One particularly useful method is by triggering a light on the target upon hit, however hosting lights on or near a target posts a challenge, that of the destructive power of bullets or other projectiles. U.S. Pat. No. 8,356,818 B2 describes such an attempt to achieve this by using durable polycarbonate to shield a light source, configured to withstand an impact from a bullet, leaving the target and light source undamaged after each bullet strike. However there is a limit to the durability as shooters will find a larger caliber that will eventually destroy the polycarbonate shield, and the manufacturer will hit a limit on the thickness of the polycarbonate design before it no longer makes sense to manufacture. What is needed is a system that is designed to allow impacts to pass through the material, minimizing the amount of damage made. Many rubbery polymers and elastomers have such a property whereby any projectile may simply slip through, allowing the material to reform and reseal. Self-healing polymers and elastomers can then reform at a molecular level to strengthen any weakened areas. Accordingly, there is a need to use a partially or fully self-healing polymer or elastomer diffuser, with a light source directed into the diffuser but out of the way of a bullet's path, to distribute the illumination on or around a shooting target. This solution provides the opportunity for the light diffuser to accept virtually any caliber of bullet strike, and continue undisrupted operation.

Other patents use certain methods of electronically determining the location of the hit. For instance, Lockheed Martin Corporations' ® U.S. Pat. No. 8,561,993 B2 uses a plurality of impact sensors on divided parts of a target. This system requires slots to be present within the target. U.S. Pat. No. 8,356,818 B2 describes multiple hit zones tied to lit target sectors. This system requires durability such that a bullet will not damage the target, a virtually impossible task. U.S. Pat. No. 9,612,092 B2 also discloses art on the use of a plurality of sensors a target frame. The system precludes it from use on the target. US patent 20090102129 A1 describes art using a plurality of sensors that then are used to calculate the point of impact of a projectile while U.S. Pat. No. 9,429,397 B1 also uses a calculation method. U.S. Pat. No. 8,523,185 B1 is closer to our invention in that it describes a plurality of hit sensors across a plurality of targets, however it outputs its hit information as an audible hit announcement. Finally, U.S. Pat. No. 9,429,397 B1 describes a plurality of sensors on a target that also uses triangulation calculations as a way to detect hit location.

While these technologies are available, none offer the use of target illumination in the course of game mechanics under live-fire. Accordingly, the need for a target system with an illumination system that can allow the penetration and of bullets of any caliber, arrows, and other projectiles, while providing, and reforming to continue trouble free live fire gaming and drills. There is a growing need for gamification in targetry as digital hit detection, processing, and response feedback provide for a unique experience in challenge, game logic, and data recording for performance trends and goals.

The transformation of target hits to data allows us to store data for analysis and aggregation on the cloud, mobile devices such as iOS or Android, control for identity of each shooter.

SUMMARY OF THE INVENTION

It is an object of the present invention to provide a polymer or elastomer shooting target or shooting target illumination system that is capable of receiving light, projecting or diffusing said light, and partially or fully self-heal if struck with a bullet or other projectile.

The polymer or elastomer in this aspect of the invention may use one or more methods of dispersing illuminating light such as with reflective sides, diffusive add ins that aid in homogenous transmission of light, and semi-transparent polymers or elastomers that transmit light naturally.

In accordance with one aspect of the invention, the illuminated polymer or elastomer is itself the target, designed to take all shots fired and provide programmatic game mechanics with the use of illuminated feedback, such that a hit is recorded visually with either a change in light color, a change in light brightness, a change in it's on or off state, or any other conceivable pattern one can program through software. This aspect of the invention includes hit detection, such as an embedded vibration sensor, that when disturbed sends an analog signal to the attached microprocessor for processing and recording. Embedding the sensor also provides a naturally dampened isolator for discrete hit zones.

In accordance with another aspect of the invention, the illuminated polymer or elastomer is not the primary target, but may live directly on or nearby, and is tethered wirelessly or by wire, to the primary target such that any strikes to the primary target will illuminate the diffusers. In this aspect of the invention, the target provides onboard or nearby illuminated feedback such that the shooter will know immediately if the target was struck. Any stray bullets will pass through the polymer or elastomer diffuser with an interruption in illumination.

All aspects of the invention are designed to operate independently as well as interact with other targets for gamified interactivity. Thus, there may be a plurality of interconnectable shooting targets.

In accordance with one aspect of the invention, the polymer or elastomer target and diffusers includes one or more small programmable logic controllers connected to one or more hit detectors, such as a vibration sensor, and one or more light emitting diodes (LEDs), mounted within or behind the target. LEDs mounted within would be embedded and become sacrificial if struck while LEDs mounted behind the target plate will be parallel to the face of the target or perpendicular to the projectile path of travel, and projected directly into the polymer or elastomer for illumination towards the shooter. The programmable logic controller also includes a radio system to send digital and or analog information to other targets on the field, repeaters, basestations, mobile devices and computers, required to operate a multi-shooting target game experience.

In accordance with another aspect of the invention, the shooting target has one or more forward-facing, side-lit light reflector and diffuser to reflect and evenly distribute light from the laterally mounted LEDs behind the target so that a shooter can clearly see the indicated light and color from any shooting distance. The diffuser is a diffuser element able to evenly distribute light received from the LEDs which are a light-emitting element. A shooting target which can display light is an illuminable shooting target.

In accordance with another aspect of the invention, the shooting target includes one or more cut outs, channels, or mounting areas designed to fasten a light reflector and diffuser such that it will stay affixed to the target during use, but break away when struck directly, allowing all impact debris to exit the rearward area of the target.

In accordance with another aspect of the invention, the fastener of the shooting target is designed such that replacing any damaged or missing lighting component requires a simple slip-on system for quick and economical replacement.

In accordance with another aspect of the invention, the primary shooting target with associated areas of illumination includes one or more hit detectors such that illuminated feedback can be localized to the area struck, such as the center-mass area, the head, or general body.

In accordance with another aspect of the invention, the system includes a plurality of targets, each of the targets having one or more hit detection sensors connected to the striker target plate, each sensor producing an electronic signal when struck by a projectile. The programmable logic controller (PLC) attached to each target receives the hit detection signal, processes the information, activates or deactivates respective lights according to the software instructions controlling the PLC. Therefore, the programmable logic controller controls the lights in response to an output of a hit sensor.

The PLC also sends the processed information to the transceiver to coordinate the data to a central processing unit on the field, which receives information back from the central processing unit, which continues a set of instruction per the software on the field. This software, controlled by a mobile device such as IOS and Android, provides the ability to reproduce digital game mechanics that resemble video game rules, and even mechanical steel target systems such as a dueling tree. In the dueling tree, example, the central processing unit, or base station, on the field identifies all targets in the dueling tree configuration and provides instruction to volley possession of the target back and forth. For instance, if all targets on the left side of the tree are lit, the central processing unit on the field will tell target IDs on the right to light up if any target IDs on the left are struck. And vice versa. Therefore, the hit sensor of one target can affect or control the lighting of another target, via the programmable logic controller of each target, each programmable logic controller being in two-way communication with the central processing unit.

Similarly, a plate rack challenge game mechanic can be achieved by lighting up all targets, then each target, when struck sends hit time data to the central processing unit, while also changing the light color or on off state, and aggregating all data for competitive analysis on a mobile device.

In addition to the statements of invention hereinbefore, a further aspect of the invention is provided wherein an illuminable shooting target comprises a body having a user-visible target surface which in use faces a shooter; a light-emitting element associated with the user-visible target surface; a light-transmitting portion which is positioned at or adjacent to the user-visible target surface and is communicable with the light-emitting element to output light emitted therefrom; and a hit detector which controls the light-emitting element in response to an impact, characterised in that the light-transmitting portion is at least in part elastically deformable to accommodate a projectile therein whilst maintaining communicability with the light-emitting element.

Preferable and/or optional features of the above-mentioned aspect of the invention are set forth in claims 2 to 14, inclusive.

According to a further aspect of the invention, there is provided a target-shooting game set comprising a plurality of interconnectable illuminable shooting targets.

Preferable and/or optional features of this aspect of the invention are set forth in claims 16 and 17.

According to a further aspect of the invention, there is provided a method of playing a target-shooting game using a shooting target or a target-shooting game, preferably in accordance with the previous aspects, wherein the method comprises the steps of a] illuminating at least one shooting target; b] impacting the illuminated shooting target; c] the shooting target indicating at least in part visually that it has been impacted by turning the light-emitting portion on, off or changing an emission.

A preferable and/or optional step of this aspect of the invention is set forth in claim 19.

According to a further aspect of the invention, there is provided a method of illuminating a shooting target, again preferably in accordance with the previous aspect or aspects, the method comprising the step of providing a sacrificial light-transmitting portion at or adjacent to a user-visible target surface, the sacrificial light-transmitting portion being formed of light-transmissible elastically-deformable material to accommodate a projectile strike therein whilst maintaining communicability with a light-emitting element.

BRIEF DESCRIPTION OF THE DRAWINGS

The foregoing and other objects, characteristics and advantages of the present invention will be more apparent from a consideration of the following detailed description thereof when read in conjunction with the accompanying drawings, in which:

FIG. 12 shows a rear perspective view of an exemplary self-healing reflective diffuser that can be quickly fixed to a target with a simple slip-on design.

FIG. 13 shows another rear perspective view of a self-healing reflective diffuser with a slip-on design, illustrating a fully open channel allowing a fastening system to enter the diffuser, perpendicular to the direction a bullet may strike the reflective diffuser. Fastening the reflective diffuser from within keeps the part in position while bullets strike and pass through.

FIG. 14 shows a front perspective view of the above self-healing diffuser, showcasing the side that receives light and the front face that light is reflected outwards and towards the shooter. This front face is also the face that receives bullet strikes.

FIG. 20.2 shows a rear perspective view of a self-healing light diffusion system with 4 channels cut through fore to aft, to allow the fastening system to come through for a locking system.

FIG. 20.3 shows the prior rear perspective view of a self-healing light diffusion system with the channels highlighted, as well as the vibration sensor embedded within.

DETAILED DESCRIPTION

Reference will now be made to the drawings in which the invention will be discussed so as to enable one skilled in the art to make and use the invention. It is to be understood that the following description is only exemplary of the principles of the present invention, and should not be viewed as narrowing the pending claims.

Figure 1:
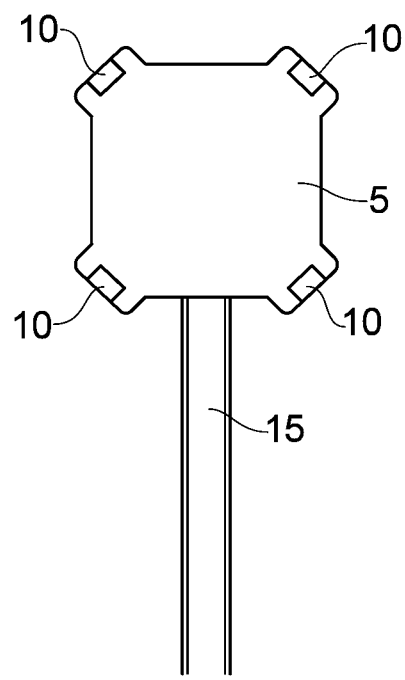
FIG. 1 shows a forward view of an exemplary embodiment of a shooting target with a lighting system built in to the target itself.

Referring to FIG. 1, there is shown a forward view of an electronic shooting target 5, including forward facing illumination 10 by means of a self-healing polymer, silicon, eurethane, polyurethane, rubber, or other similar material, that includes reflective, light diffusive, and/or light transmitive properties. The shooting target 5 includes a body having a target plate which forms a user-visible target surface which in use faces a shooter. In this embodiment, the user-visible target surface defines a primary impact surface.

The terms 'reflective diffuser', 'diffuser', 'self-healing diffuser', 'reflective lighting diffuser', 'self-healing polymer', 'self-healing reflective lighting diffusor', 'rubbery diffuser', 'self-healing light diffusion system' used herein and throughout are together intended to mean a 'light-transmitting portion'.

As shown in FIG. 1, the light-transmitting portion is positioned at or adjacent to the user-visible target surface 5b, and at one or more corners of the primary impact surface, in this case four.

In an alternative arrangement, the or each light-transmitting portion may be positioned on at least one side instead of or in addition to being at one or more corners of the primary impact surface.

This figure also includes a target stand 15 by which the target is elevated.

The target plate 5 is preferably cut from a hardened material such as AR550 steel and is designed such that it will take impact from a bullet or projectile and send its fragments in roughly all directions perpendicular to the bullet's path of travel.

The target plate 5 has attached on its backside a vibration or other hit sensor (referenced as 305 in FIG. 8) to sense any strike and send a signal back to an onboard microprocessor to then actuate the illumination 10 programmatically. The term 'hit sensor' is also referred to herein and throughout as a 'hit detector'. Thus, the hit detector 305 controls the illumination of the light-transmitting portion in response to an impact via the programmable logic controller.

Figure 2:
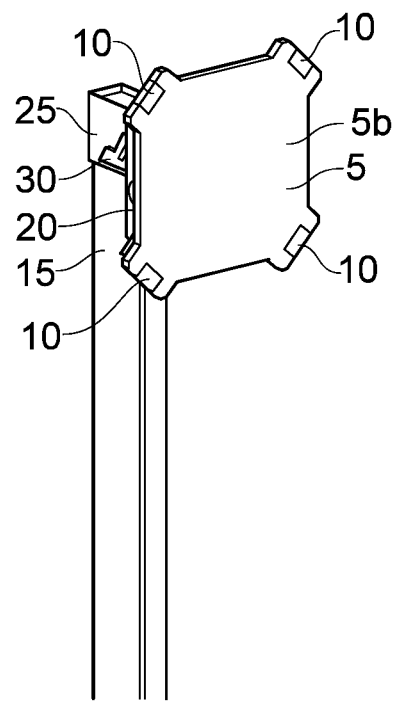
FIG. 2 shows a forward perspective view of a target assembly that shows a target fastened to a stand, as well as a partial bracket view that both fastens the target to the stand and protects the target's electronics from lateral bullet fragment impact damage.

FIG. 2 shows a forward perspective view of an electronic shooting target that shows a partial view of a target bracket system 20 that interfaces with both the target assembly and the stand bracket 25 and the stand bracket arms 30.

Figure 3:
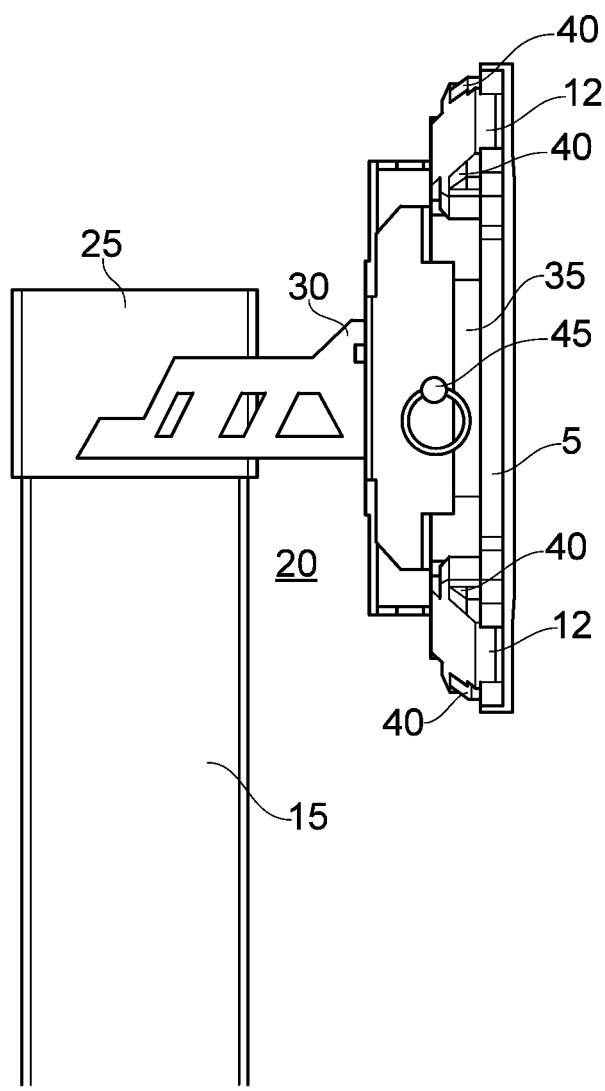
FIG. 3 shows a side view of a target assembly that shows a quick release system to remove the target from its stand, as well as the fixed nature of reflective, self-healing light diffusers.

FIG. 3 shows a side view of an electronic shooting target, providing a partial view of the target assembly and bracket systems.

Figure 4:
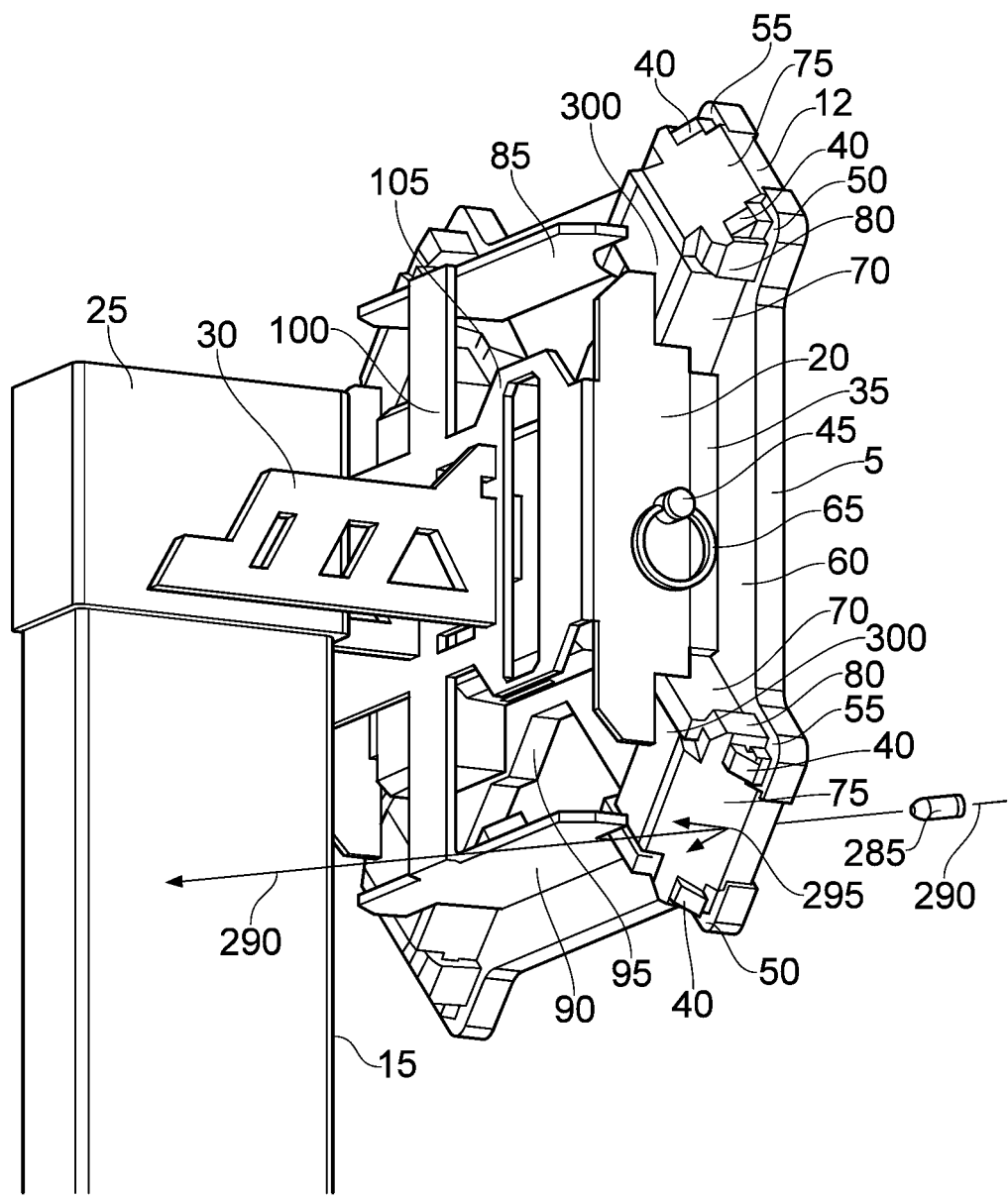
FIG. 4 shows a close rear perspective look of a target assembly that shows the stand, bracket systems, quick release pins and pull rings, radio frequency spacing cut outs, target electronics housing, blast damage shielding, and reflective, self-healing light diffusers and fastening systems.

FIG. 4 shows a rear perspective view of the target assembly. Included in this drawing is an illustration of the self-healing reflective diffusers 12, and the fastening arms 40 that both allow a quick slip-on replacement and fix the part in place in all directions. The light-transmitting portion 12 is receivable by an interference fit in or on the fastening arms 40. As the fastening arms 40 are found on the body, the light-transmitting portion 12 is receivable in or on the body. Whilst described as an interference fit, it will be appreciated the light transmitting portion 12 may be attached to the fastening arms via fasteners.

The fastening arms 40 lie on a plane that is perpendicular to any projectile vectors 290. Coupled with a full wrap around arm enclosure 80, the fastening arms 40 provide a strong counter force to any projectile 285 strikes, ensuring the diffuser 12 stays firmly in position during each said strike.

Not shown is a reflective paint applied to the primary reflective side 75, angled at 45°, such that any light passing in will reflect out at 90° relative to its entry. This reflective paint or reflective layer is a reflector element forming part of the light-transmitting portion 12 for reflecting light outwards to the user from a light-emitting element 110.

Also illustrated is the interaction of a bullet or other projectile with the self-healing reflective lighting diffuser. A bullet or projectile 285, if on a vector 290 that intersects with the self-healing reflective lighting diffuser 12, will simply tunnel through and eject at a point 295 leaving minimal damage that may allow a self-heal of both the polymer material and reflective paint coating on 75. The self-healing reflective lighting diffuser or light-transmitting portion 12 is resilient to the force of an impact and does not shatter, thus is shatter resilient.

Generally shown is the entire target assembly FIG. 4, including the target side bracket including the bracket back 100, sides 20, top 85, and bottom 90. This bracket is designed out of a hard metal to withstand adjacent shrapnel and both fasten down and protect the internal electronics housing 95. The target side bracket sidewalls 20 extend out over the electronics housing arms 300 to act as a stop once the quick release pin 45 is inserted. A target side mounting point 35 aligns the bracket's placement as well as serves as additional adjacent shrapnel shielding. A hole of equal diameters lives in the target side bracket mount 35 and the bracket side wall 20, and are coincident to one another such that a quick release pin 45 with a pull ring 65, or other such fastening system, can lock all parts together. Finally, the backside of the diffuser fastening arms 70 serve to align the electronics housing 95, and projector arms 300, and also consists of a hard metal material to protect against adjacent shrapnel impacts.

Figure 5:
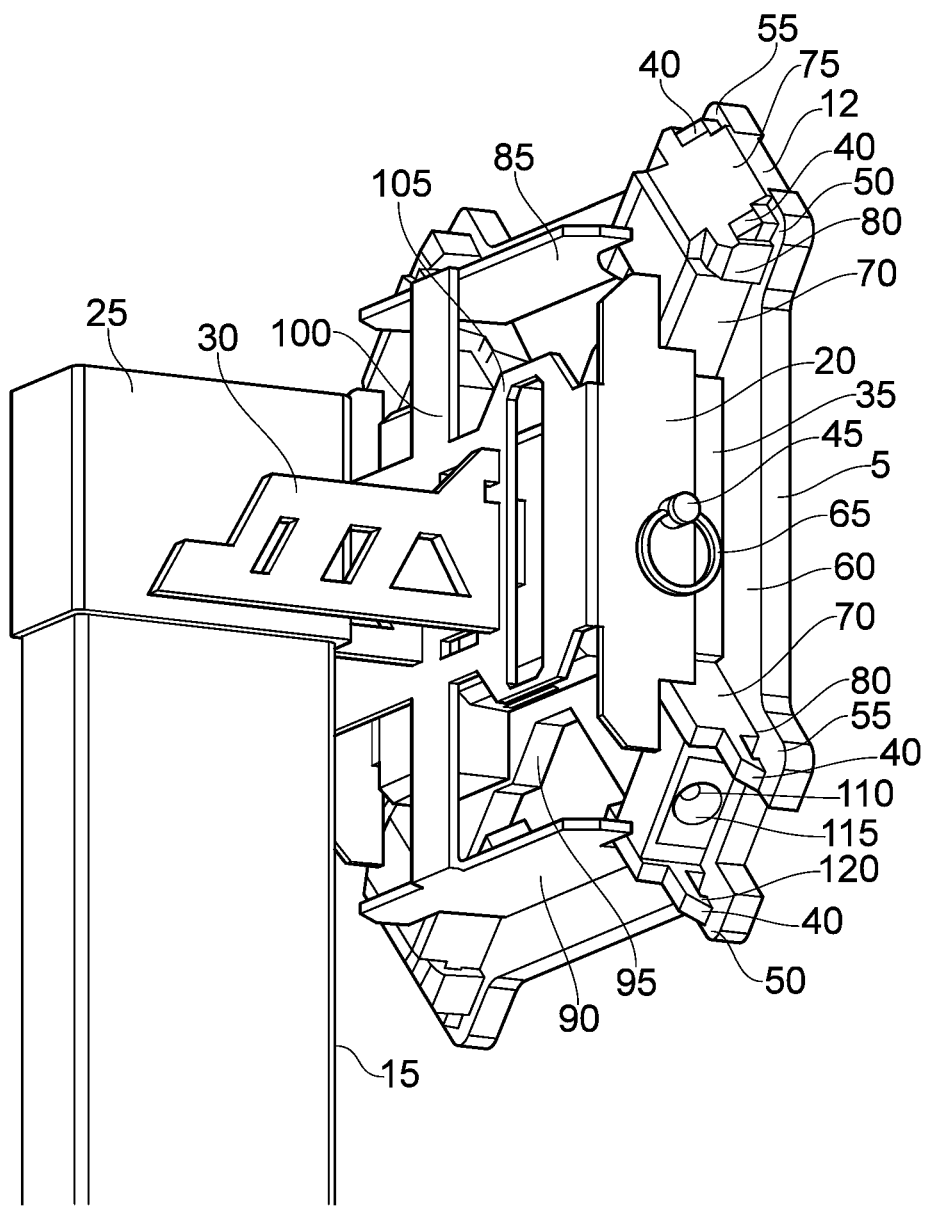
FIG. 5 shows another rear perspective view of the target assembly from the rear perspective with the diffuser removed to reveal the LED projector and highlight the projection of light into the diffuser.

FIG. 5 shows the prior rear perspective view with the self-healing reflective diffuser 12 removed, revealing the LED 110 and its sub assembly, which includes a projector 115 to concentrate and direct the light directly through the self-healing diffuser 12. Together the LED 110 and its sub-assembly used herein and throughout are together intended to mean a 'light-emitting element". The 'light-emitting element' may be more than one LED 110. As shown in FIG. 5, the 'light-emitting element' is associated with and is at or adjacent to the rear of the user-visible target surface.

This figure also more clearly shows the fastening arm 40 and the additional notch 120, a geometric addition to the friction fit hold to mechanically lock the rubbery diffuser into position. As such, the light-transmitting portion 12 is receivable in or on the body and is connectable via interference fit, although fasteners may be considered.

Also shown here is large RF cutout 105 to allow for radio waves to pass through the bracket to and from the internal antenna within the electronics housing 95. However, it will be appreciated that the cutout may instead be replaced by the bracket being at least in part formed from radio wave permeable materials.

Figure 6:
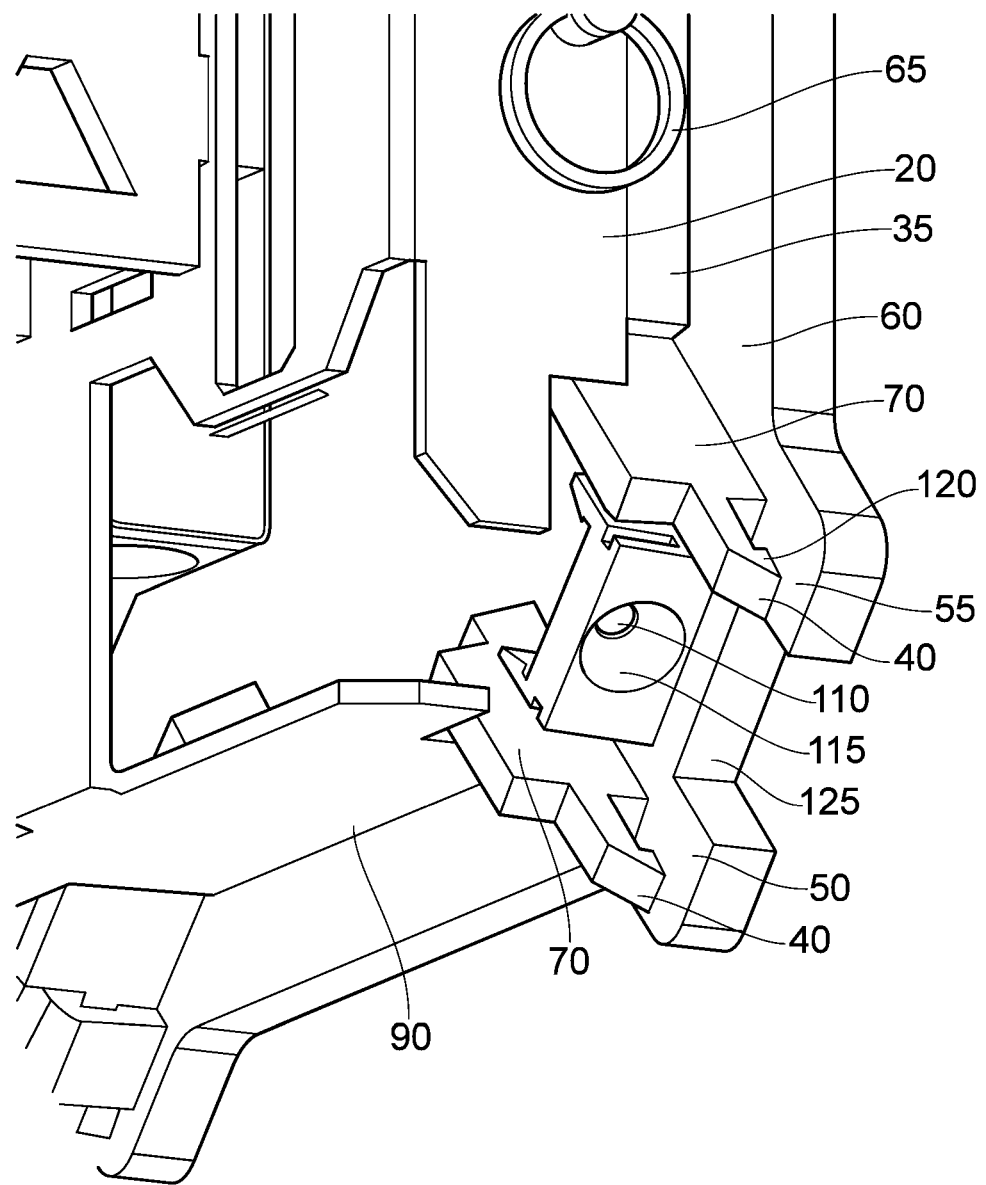
FIG. 6 shows a closer rear perspective view of the target assembly from the rear perspective and shows an exemplary method of quickly fastening a self-healing polymer reflective diffuser to a target that provides both quick changes yet durably fixes positioning to allow projectiles to impact and pass through without disrupting the operation of transmitting light.

FIG. 6 shows a closer look at the prior rear perspective drawing. The diffuser cutout 125 shows one exemplary embodiment of a location for the self-healing reflective lighting diffusor, and the left side and right side diffuser arm 40 mounting points, 50 and 55 respectively, are designed to be wide enough to shield the diffuser fastening arms 40 from any projectile strikes.

Figure 7:
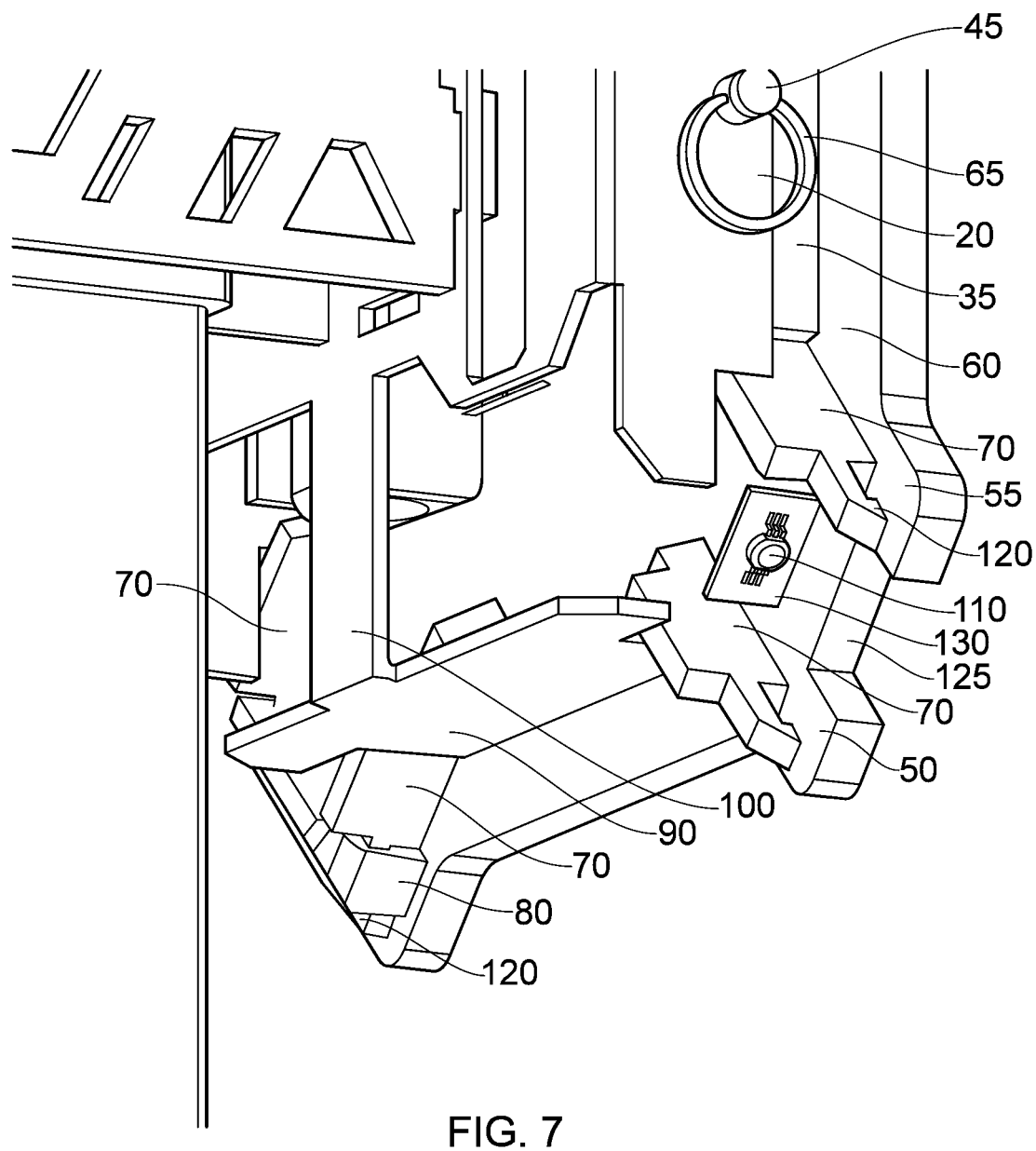
FIG. 7 shows a rear perspective view with the reflective self-healing diffuser and projector housing removed to reveal the internal LED and metal clad PCB.

FIG. 7 shows the prior rear perspective drawing with the projector housing and diffuser removed to reveal the LED 110 and its metal clad printed circuit board 130, that is wired directly back to the microprocessor, not shown.

Figure 8:
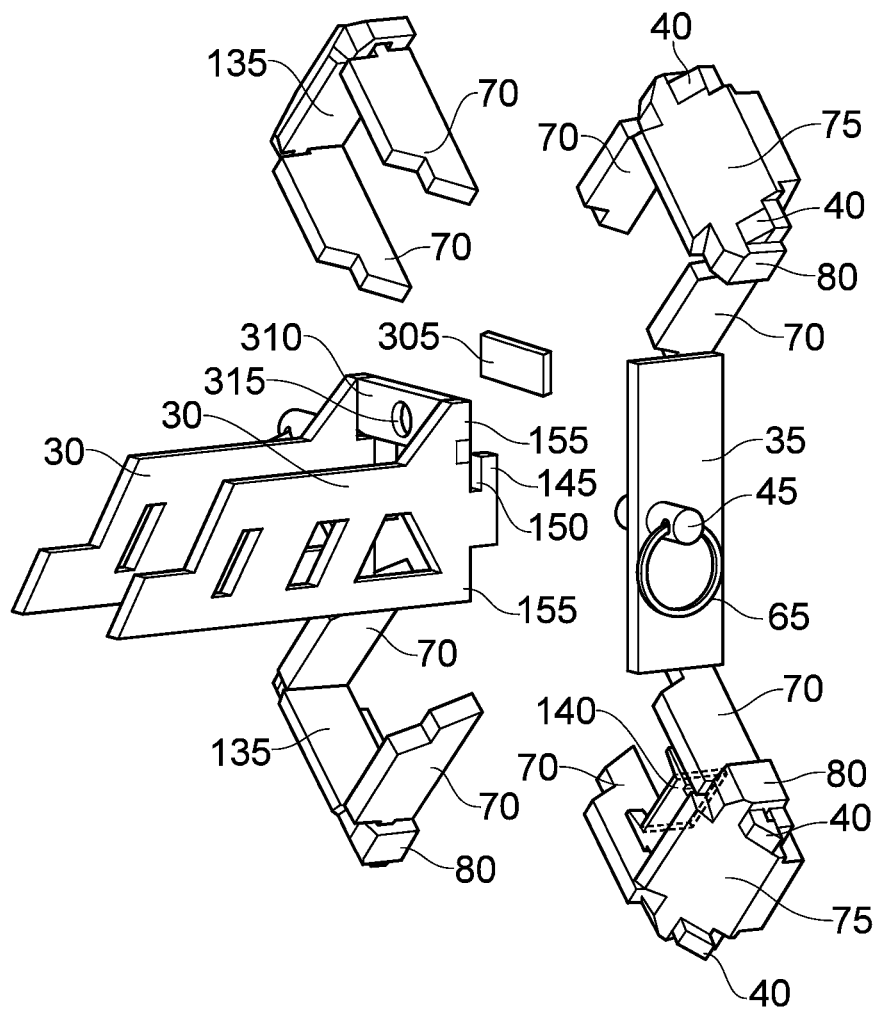
FIG. 8 shows a rear perspective view with the target plate, stand, electronics housing, and the target side bracket removed. This showcases a slip-on design of the bracket mounting system, the quick release system, and the individual lighting systems.

FIG. 8, a rear perspective drawing, shows bracket mounting points 35 and diffuser mounts 70 sans or without target plate 5, and illustrates the parts that preferably are welded or fastened down. Also shown is a vibration hit sensor 305, wired to the microprocessor within the electronics housing 95, not shown. Also included in the drawing is a stand-side bracket slip-on mount hook 145 on the stand-side bracket arms 30, which braces the fore side of the target-side bracket back 100, as well as the aft-side braces 155 for the backside of the target-side bracket back 100, to allow for a gravity controlled vertical position hold, and a mechanical lock for the horizontal directions. A locking plate 310 with a hole cut 315 with a diameter equal to the hole cut 170 in the target-side bracket back 100, and are aligned coincident to one another to quickly lock the vertical movement if needed.

Figure 9:
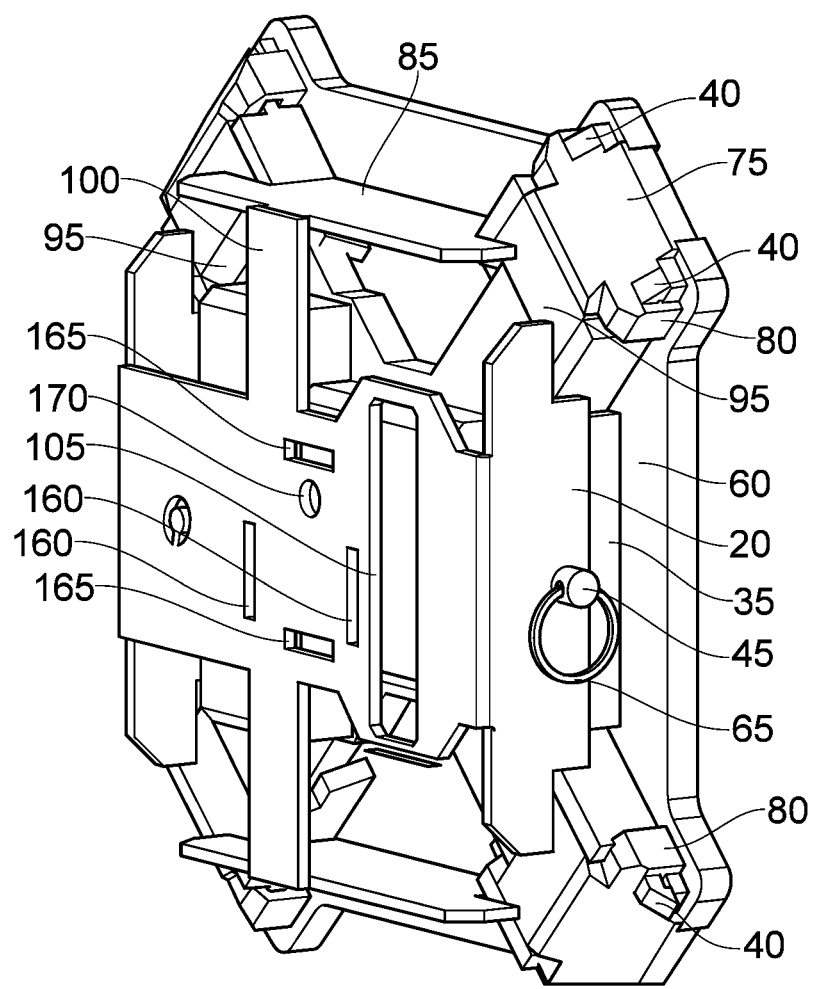
FIG. 9 shows another rear perspective view of the target assembly with the stand and stand side bracket system removed for a clear view of the entire assembly. Showcased here is an exemplary version of a quick servicing system where by the removal of two quick release pins allows removal of both the target side bracket system as well as the electronics housing. The target side bracket interfaces with both the target mounting system, the stand mounting system, and also pins down the electronics housing. The bracket system shown also illustrates the protection it provides for bullet shrapnel both horizontally and vertically.

FIG. 9 shows a rear perspective drawing of the target assembly with the stand and stand-side brackets removed, to illustrate the vertical slots 160 by which the slip-on mount hooks FIG. 8 145 enter and slide up to mechanically lock horizontally. Also shown are horizontal slots 165 to reorient the target if needed.

Figure 10:
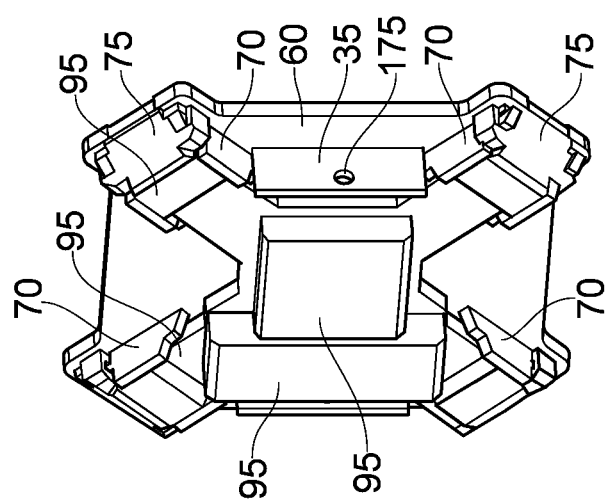
FIG. 10 shows a rear perspective view of the target assembly with all stands and brackets removed, showing the electronics housing which includes all necessary components such as battery systems, radio/antenna systems, programmable logic controllers, wiring, and lighting.

FIG. 10 shows a rear perspective drawing of the target assembly without the stands and brackets. With the protective mounting brackets removed, the electronics housing 95 is revealed. Preferably, all electrical components are housed here and includes the programmable logic controller, power systems, radio systems, wiring, vibration sensors and lighting systems. Also shown is the quick release hole 175 on the target side bracket mount 35. The electronics housing 95 is preferably constructed out of a durable polymer for precision placement of components and economical manufacturing, and may include embedded dampening components that sit against the back 60 of the target plate 5.

Figure 11:
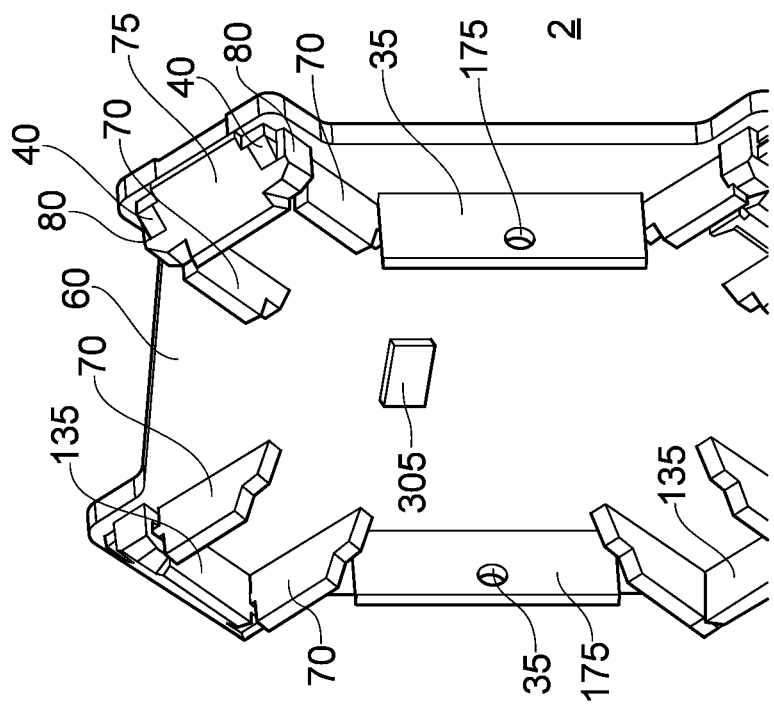
FIG. 11 shows a rear perspective view of the target assembly with the stand, bracket systems, and electronics and housing removed to showcase the lighting diffusers and their associated fastening systems. These fastening systems provide shielding from side impact and blast damage along with the target side bracket mounting system.

FIG. 11 shows a rear perspective drawing of an exemplary placement of a vibration sensor 305, affixed directly to the back 60 of the target plate 5. The particular signal or vibration sensor can be tuned via software on the programmable logic controller to detect only vibrations within practical ranges. Also shown in the drawing is the light entry side 135 of the diffuser 12.

FIG. 12 shows a rear perspective drawing of an exemplary embodiment of a self-healing reflective light diffuser. The material of the diffuser is a substance that has the built-in ability to automatically repair damage to itself through the process of reforming broken molecular bonds, or simply minimize damage and deformity with an elastic material such that when penetrated by a projectile, the body of the material will stretch and deform, then close up and partially reseal as the projectile passes through. The light-transmitting portion 12 is therefore at least in part, and preferably, entirely, elastically deformable.

Tear strength of the material must be sufficient for the diffuser to sustain bullet impacts without tearing the arm wrap 80 from the diffuser arm mounts 40. The diffuser is held in place through a friction fit provided naturally by a tightly fitted open channel 190 rubbery wrap 80 over the metal diffuser fastening aim 40, as well as the catch 120 at the end of the diffuser fastening arm 40, locking onto the seat 200 and its adjacent walls. While the fastening arm channel 190 provides for a quick replacement feature with the lateral slip-on design, it also provides for an exceptionally strong fastening system built to withstand bullet strikes. The fastening aims secure the diffuser from within the part's own open channels 190, holding down the part on a plane that is perpendicular to the vector of a bullet, keeping it held in position. Due to the light-transmitting portion 12 being held in position following the impact of a projectile and being partly elastically deformable, the light-transmitting portion 12 is able to accommodate a projectile whilst maintaining the ability to emit or transmit light from the light-emitting element.

FIG. 13 shows the prior perspective view of an exemplary embodiment of a diffuser 12, with a partially transparent view of the open fastening arm channels 190. Also shown is the direction of light 280 passing through the entry side of the diffuser 135, reflecting off the primary reflective side 75, and exiting out the front face 10 of the diffuser. The front face 10 of the light-transmitting portion 12 is a front surface or user-facing portion and defines a secondary impact surface. The light-transmitting portion 12 therefore is an elastically deformable block having a user-facing portion and a support body portion, not visible to the user, for receiving light 280 from a light-emitting element via the entry side 135. The light-transmitting portion 12 is communicable with the light-emitting element. The primary reflective side 75 is a rear surface behind the front surface and which is at an angle relative to the said front surface.

Not shown in the drawing is a reflective coating or paint applied to all sides of the diffuser with exception to the entry side 135 and the front face 10. Consequently, the reflector element of the primary reflective side 75 is, in this case, a reflective coating on the rear surface of the light-transmitting portion.

This coating may be a self-healing material itself, or bond tightly enough to the diffuser's material or substrate as to follow the natural surface reforming as it heals and or reseals, either partially or fully. As the material properties of the reflector element are similar to the diffuser of the light-transmitting portion, the reflector element is also elastically deformable to accommodate a projectile passing through the light-transmitting portion and maintain communicability with the light-emitting element. Alternatively, the primary reflective side 75 may be a prism-like reflector.

Figure 15:
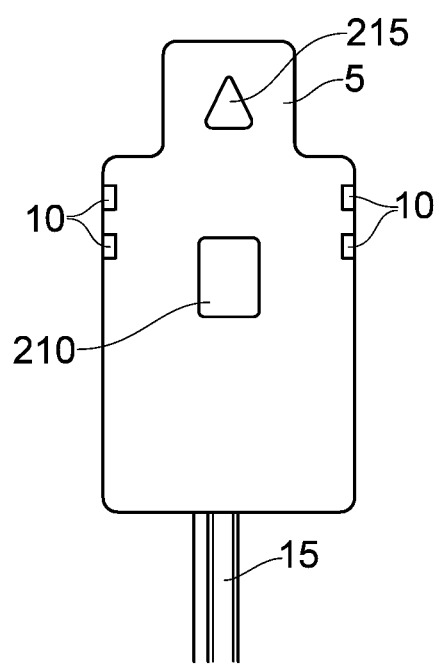
FIG. 15 shows a forward view of another target style that utilizes a self-healing light diffuser in other exemplary embodiments. This figure showcases a self-healing polymer that is itself the target, with an embedded vibration sensor. Also shown in the figure is a multiple hit-zone system, the larger torso geometry, the center mass square, and the head triangle, common in law enforcement qualifications and shooting sports.

FIG. 14 shows a front perspective view, illustrating the light entry side 135 and exit side 10, of the diffuser. Thus, the light-transmitting portion outputs light 285 received from the light-emitting element. Furthermore, the hit-detector controls the light output of the light-transmitting portion by controlling the light-emitting element. Additionally, as multiple interconnectable targets can used as part of a target-shooting game set, the hit-detector of one shooting target can alter the output of a light-emitting element of another shooting target. FIG. 15 shows a forward view of another target style that utilizes another exemplary embodiment of self-healing lighting systems. The target plate 5, with the geometry of a traditional torso design common in law enforcement qualifications and other shooting sports, utilizes two self-healing light diffusion systems 210 and 215 that are themselves the target. Therefore, in this embodiment, one light-transmitting portion is the primary impact surface whilst the target plate or target surface defines the secondary impact surface. In this case, each of the two light-transmitting portions defines a first and second primary impact surface respectively.

Figure 16:
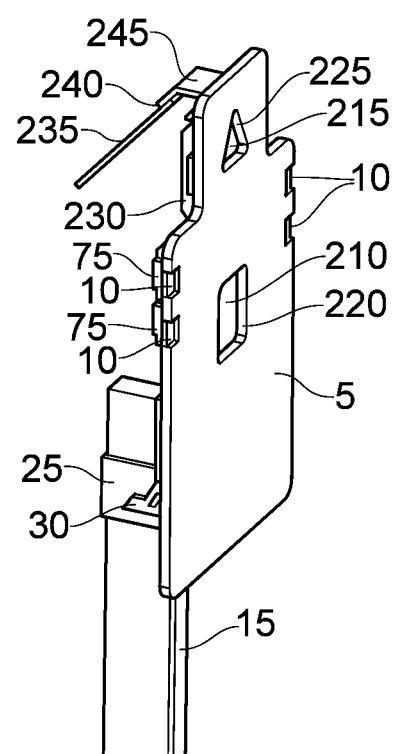
FIG. 16 shows a side perspective view of the prior multiple-hit zone target with partial views of the lighting systems and their cutouts.

FIG. 16 shows a forward perspective view of the prior target system with a partial view of the lighting assembly behind the target plate 5. It also shows cutouts in the center-mass area 220 and head 225 to allow projectiles to pass through to the self-healing targets 210 and 215.

Figure 17:
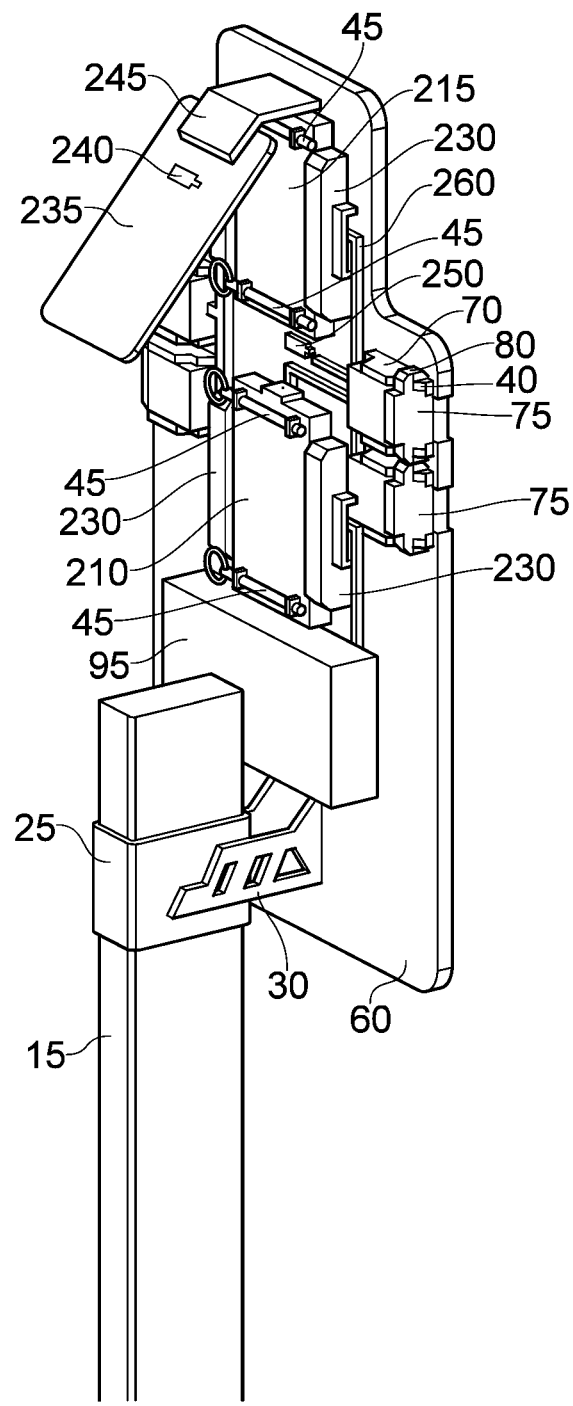
FIG. 17 shows a rear perspective view of the prior multiple-hit zone targets that showcases multiple hit sensor methods. One vibration sensor is shown affixed directly to the back of the target plate. Another vibration sensor is shown embedded within the self-healing polymer diffuser. Finally, another sensor is shown attached to a secondary steel plate behind the self-healing polymer diffuser.
Figure 18:
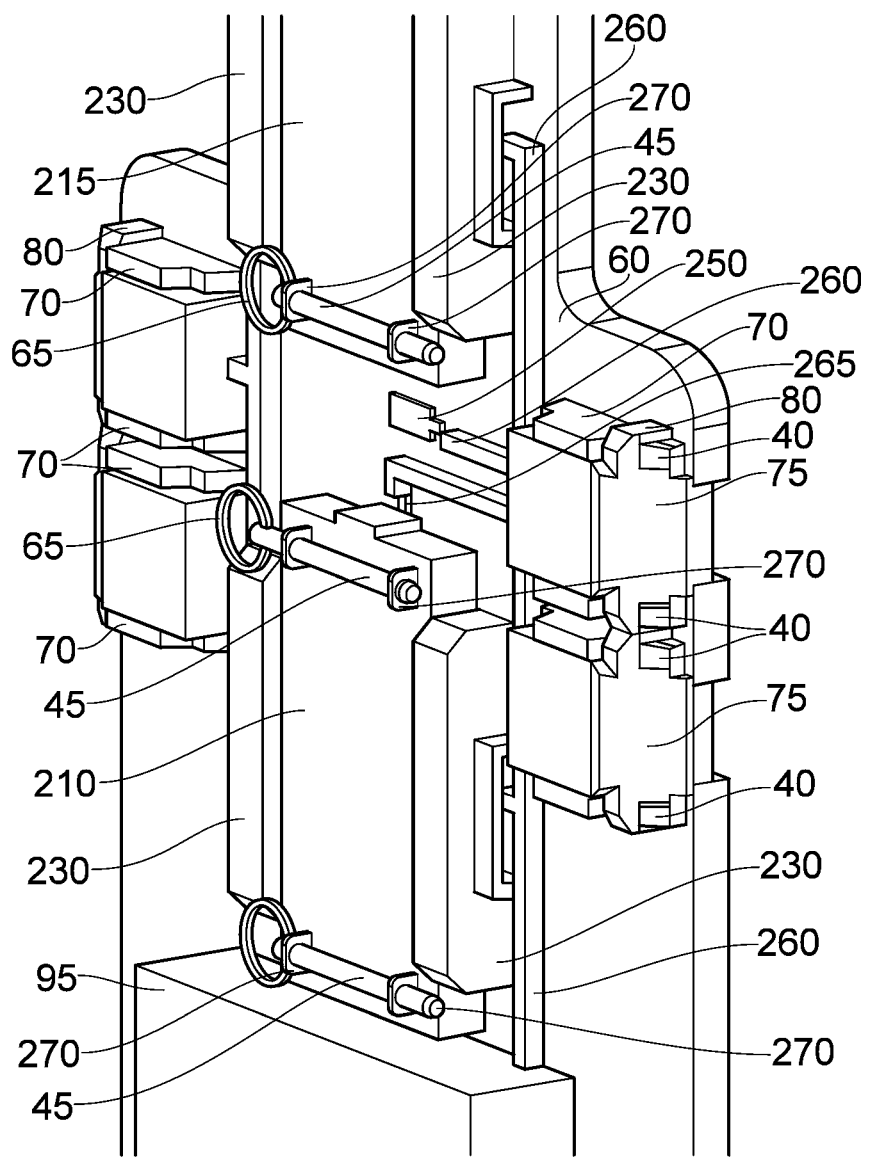

FIG. 17 shows a rear perspective view of the prior target system with a clearer view of the pass-through design of the center-mass 210 self-healing light diffusion target, that itself has an embedded vibration sensor 265 for localized hit detection. FIG. 17 also shows an embodiment of the self-healing light diffusion polymer as a target in the head 225 area, that includes a secondary metal target plate 235 behind it, fastened by a weld or hinge 245. The secondary metal plate 235 acts as an audible indicator as the metal will provide a ring upon impact, while also housing second localized hit detection vibration sensor 240 that is wired back down to the electronics housing. Also shown in FIG. 17 is the third vibration sensor 250 affixed directly to the back of the target plate 60. The three discrete hit detectors, 240, 250, and 265 provide for multi-hit zone feedback detection that the programmable logic controller and software can use for gamification and lighting feedback. Therefore, a shooting target may have a plurality of independently-controllable light-transmitting portions.

Figure 19:
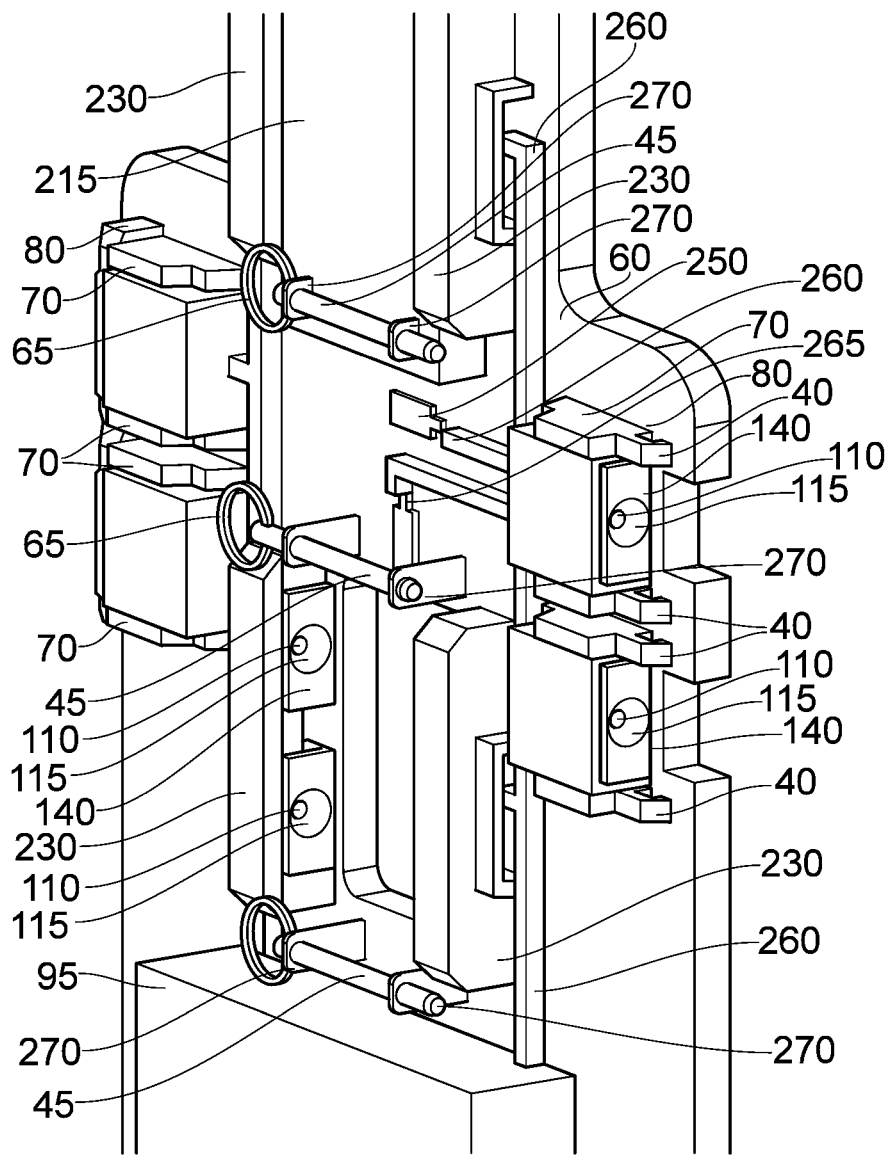
FIG. 19 shows a closer rear perspective view of the torso shaped target assembly and the mixture of self-healing polymer lighting system embodiments.

FIG. 19 shows a closer rear perspective view of the prior target design with a focus on the fastening system for the both center mass diffuser target 210 and the head diffuser target 215. These follow a horizontal slip-on system that presses over arm locks 270 from the aft to the fore position, against the back 60 of the target plate 5. Both diffuser targets are mechanically locked in their position with a quick release detent pin 45 at both the top and bottom ends of the diffuser target. LED lighting systems 270 lie adjacent to the diffuser target to illuminate the entire block of material 210 and 215. Shown with more clarity is the embedded hit sensor 265 and the protected cabling paths 260 for all sensors and lights. Finally, the electronics housing 95 is connected to all sensors and lights, and houses the programmable logic controller, radio antenna for data transmission to other targets, repeaters, base stations, mobile phones, and computer controllers.

Figure 20:
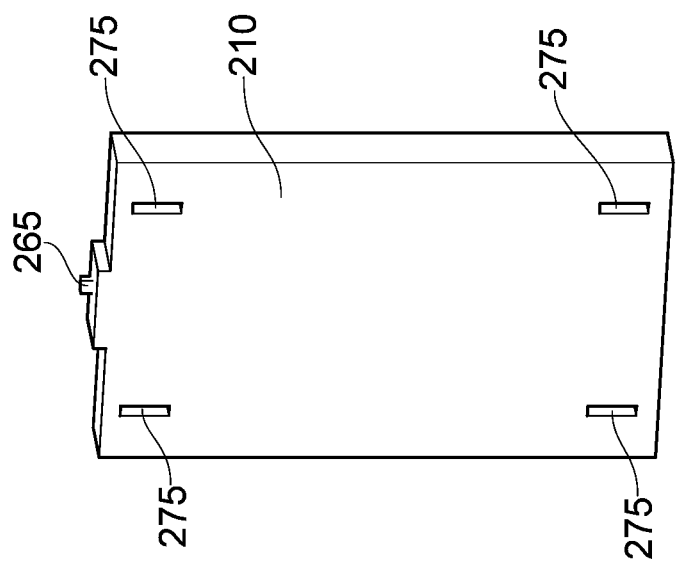
FIG. 20 shows another rear perspective view of the torso shaped target assembly with the self-healing light diffusion systems removed to reveal the LEDs and their projection systems. Also shown are another exemplary fastening system to fix the self-healing light diffusion systems in place.
Figure 23:
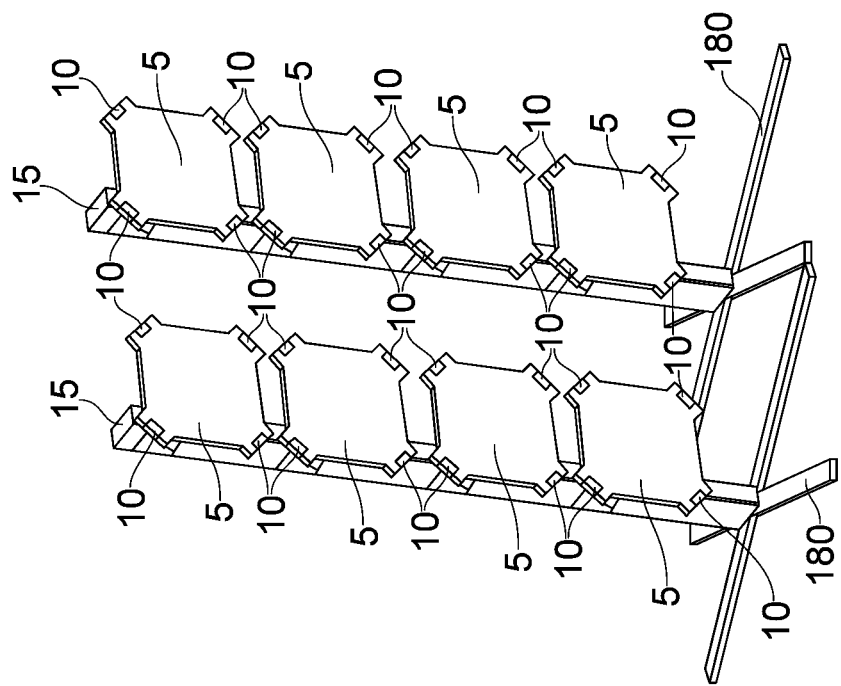
FIG. 23 shows a front view of one embodiment of an illuminable shooting target in accordance with one aspect of the invention.

FIG. 20 shows a rear perspective view of the prior target drawing with the self-healing diffuser targets 210 & 215 removed to show more clearly the lighting assemblies 230 consisting of projector sub-assemblies 140 that include a cone shaped projector 115, to concentrate and direct the LED 110 light into the target diffusers. Also shown more clearly is the quick change system for the diffuser, consisting of the quick release detent pin 45 pushed through both diffuser mount arms 270, mechanically locking the replaceable diffuser target in place.

FIG. 20.2 shows a rear perspective view of a self-healing light diffusing target 210 with 4 channels 275 cut through the fore to aft.

FIG. 20.3 shows a rear perspective view of a self-healing light diffusing target 210 with partial transparency to reveal the embedded vibration sensor 265.

Figure 21:
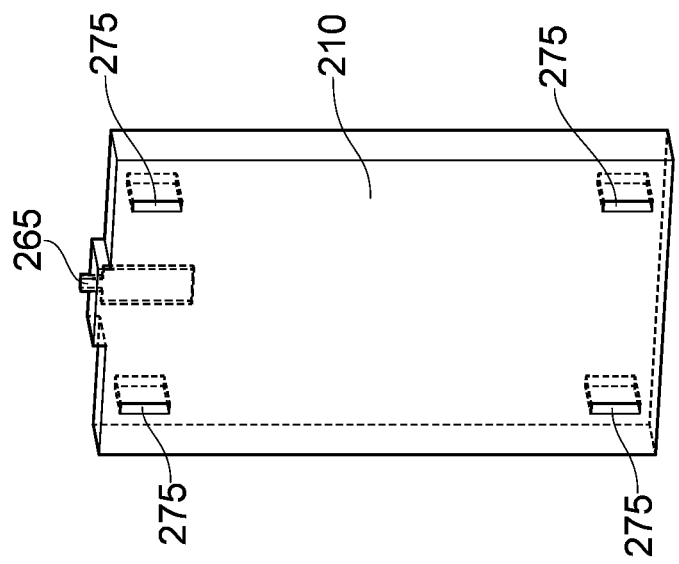
FIG. 21 shows a forward perspective view of a dueling tree target configuration for instant, resettable gaming.

FIG. 21 shows a forward perspective view of a dueling tree configuration of the target system, connected wirelessly or by wire, to produce game mechanics similar to a mechanical dueling tree. The configuration of a target system FIG. 21 shows multiple targets 5, each with a hit sensor attached, and each outfitted with self-healing reflective light diffusers 10, with each assembly consisting of a programmable logic controller. As such, the shooting target may have a plurality of bodies supported by a common stand. Such a dueling tree, as shown in FIG. 21, allows for target-shooting game using at least one of shooting target or shooting target body, the method of play the game consisting of the steps of illuminating at least one shooting target, impacting the illuminated shooting target, whereupon the impacted illuminated shooting target indicates at least in part visually that is has been impacted by turning the or each light-emitting portion on, off or changing the emission.

A software app on a mobile phone or computer can, in this configuration, reproduce the classic dueling tree whereby a hit on a target 5 on one side of the tree, will deactivate illumination and immediately activate the adjacent target's 5 illumination, producing a volleying effect from one side to another, reminiscent of its mechanical variant.

Figure 22:
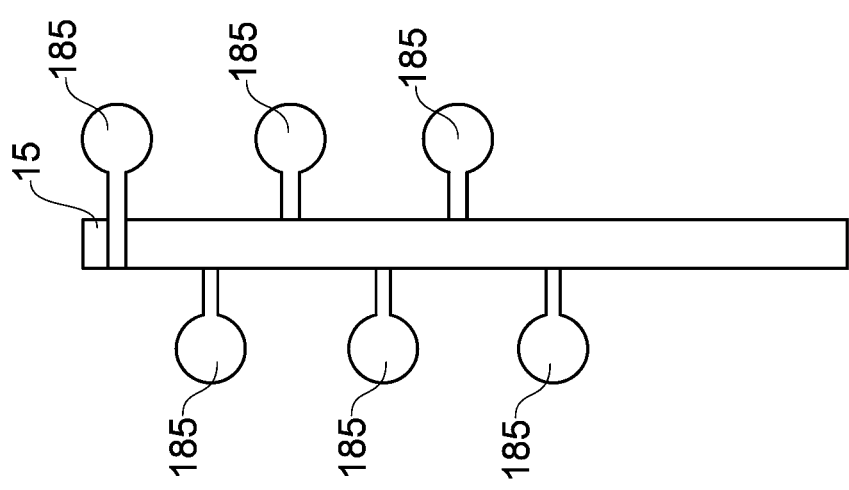
FIG. 22 shows a forward view of a traditional mechanical dueling tree.
Figure 24:
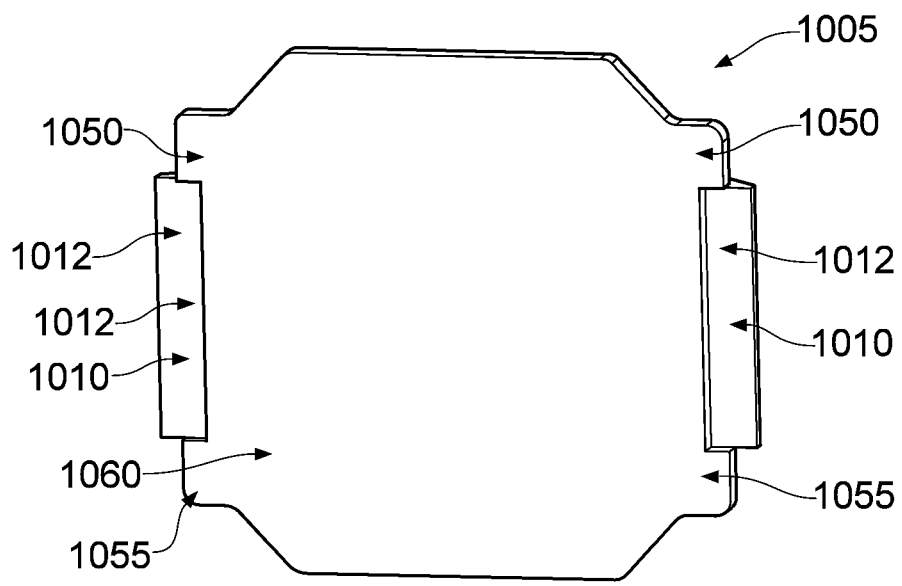
FIG. 24 shows a front side isometric view of the illuminable shooting target in FIG. 23.
Figure 25:
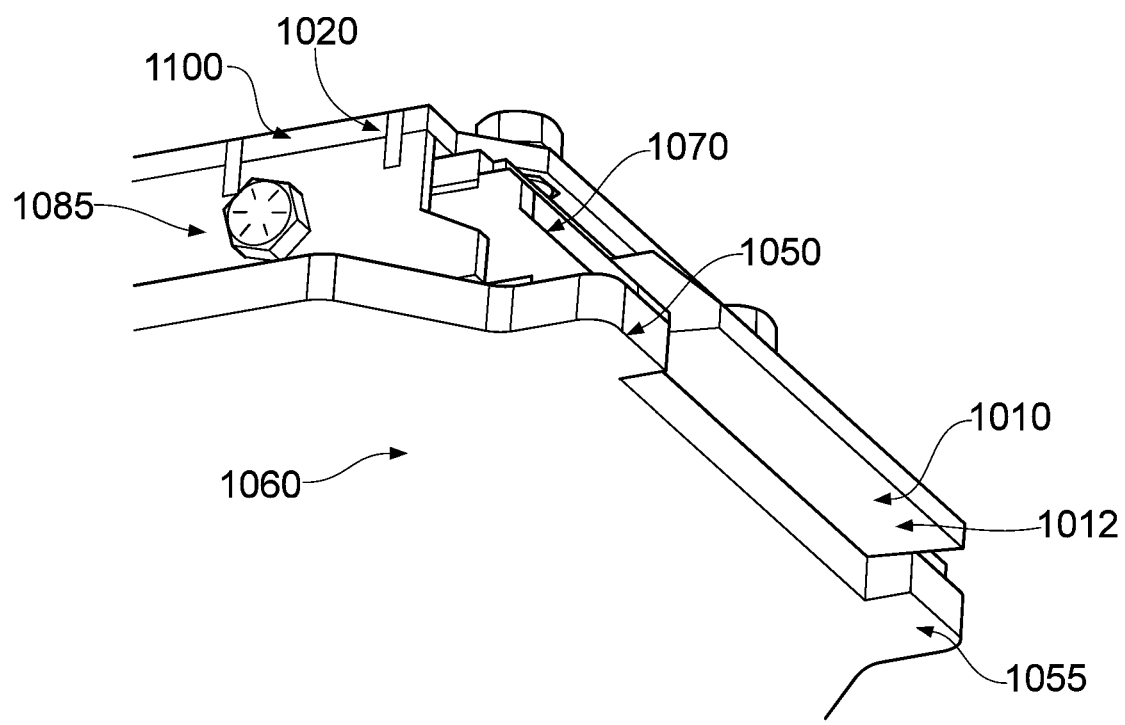
FIG. 25 front side isometric view of the illuminable shooting target body in FIG. 24, with a bracket partially removed for clarity.
Figure 26:
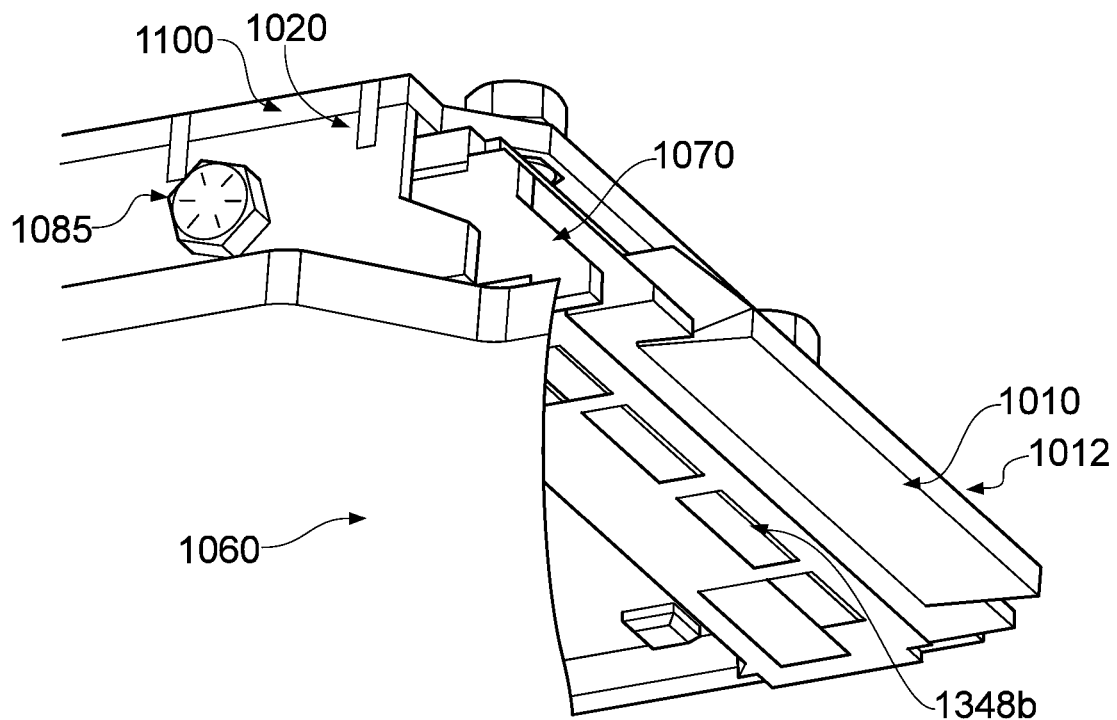
FIG. 26 back side isometric view of the illuminable shooting target of FIG. 23.

FIG. 22 shows a forward perspective view of a traditional dueling tree. Shown is the stand 15, and paddles 185 that when hit, rotate around the back and land on the opposite side.

FIG. 21 shows a forward perspective view of a dueling tree target configuration for instant, resettable gaming.

FIG. 22 shows a forward view of a traditional mechanical dueling tree.

Either of the preceding embodiments also provides an example of a method to illuminate a shooting target, by providing a sacrificial disposably-replaceable element receivable at or on the body, at or adjacent to a user-visible target surface, the sacrificial light-transmitting portion being formed of light-transmissible elastically-deformable material to accommodate a projectile strike therein whilst maintaining communicability with a light-emitting element.

Referring now to FIGS. 23 to 30, there is shown a third embodiment of an illuminable shooting target 1005, which has a main body and at least one, and in this case, two light-transmitting portions 1012.

Features in this embodiment which are the same or similar to features of the first embodiment will have the same references with '1000' added to them.

The main body of the shooting target 1005 has a target stand and a target assembly, which is fastened to a target stand via a target bracket system, similar and/or identical to that described or shown in preceding embodiments.

The target stand is preferably made of metal, but plastics or a combination thereof may be envisaged. The target stand is an elongate frame, beam or pole which, in use, extends vertically and allows the target assembly to be elevated from the ground. The target stand may be free standing with ground support elements.

Additionally, the target stand may be moveable, whether by hand or mechanically by having a motor and optionally a wheel or wheels. Alternatively, the target stand may be fixed to a further support and may not be moveable.

The target bracket system is a connecting support system, comprising a bracket 1320. The target bracket system interfaces with both the target assembly, a stand bracket and stand bracket aims, which are again not shown. This bracket 1320 or chassis is preferably formed from hard metal, for example hardened steel, to withstand adjacent shrapnel and both fasten down and protect the internal electronics housing 1095 from lateral bullet fragment impact damage. The bracket 1320 has a bracket back 1100, top 1085, and bottom 1090 but unlike the first embodiment, the bracket 1320 in this embodiment does not include bracket sides. The bracket top and bottom 1085, 1090 are preferably planar walls or surfaces which are perpendicular or substantially perpendicular to the bracket back 1100.

The bracket back 1100 has a fore side, and an aft-side or backside 1100a which faces the target stand. Referring in particular to FIGS. 26 to 29, the bracket back 1100 has preferably a plurality of vertical slots 1160, and two L-shaped slots 1322 or cuts-outs allowing for both vertical and horizontal adjustments to reorient the target 1005 if needed, as well as at least one and preferably a plurality of bracket-back bores 1324 or fastener receiving hole. In this case, the bracket back 1100 also has a large RF cutout 1105 to allow for radio waves to pass through the bracket to and from an internal antenna within an electronics housing 1095. The vertical slots 1160 are termed as such due to their longitudinal extent being vertical or substantially vertical in use.

In an alternative arrangement, the bracket back may have only one slot or hole and no other cut outs or bores, that slot being vertical, horizontal or at any other orientation there between. In a further alternative, the L-shaped slots may be another shape, such as square, lowercase "d-shaped" or "x-shaped". Alternatively, the bracket back may have one slot or each type or a plurality of one type of slot or at least one of either or both types of slots or holes.

The bracket top and bottom 1085, 1090 extend out over the electronics housing 1095, providing protection from vertical bullet shrapnel. At least one, but preferably, both the bracket top and bottom 1085, 1090 each have at least one bracket bore or hole suitable for receiving a pin or other fastener 1362, such as a screw or a bolt.

As shown and/or described in previous embodiments, the target assembly preferably comprises at least one and, in this case, two stand bracket arms for connecting the bracket back 1100 to the stand bracket. Each stand bracket arm has a stand end and a bracket end, the bracket end having a stand-side bracket slip-on mount hook or mounting hook, which braces the fore side of the bracket back 1100 and the backside 1100a of the bracket back 1100. The slip-on mount hooks are receivable within the vertical slots 1160 or the L-shaped slots 1322 of the bracket back 1100 and are slidable relative to the bracket back 1100 to mechanically lock or fix the bracket vertically and/or horizontally.

Optionally, the stand-side bracket slip-on mount hooks may also provide a means to adjust the position of the bracket by allowing for a gravity controlled vertical position hold using a locking plate similar to the first embodiment. Detailed description of the common features of the two embodiments is omitted for brevity.

The target assembly preferably further comprises a target plate 1060 or target surface.

Similar to the first embodiment, the target plate 1060 may be cut or formed from a hardened material such as AR550 steel and is designed such that it will take impact from a bullet or projectile and send its fragments in roughly all directions perpendicular to the bullet's path of travel. The target plate 1060 has attached on its backside 1100a one or more hit detectors 1305, such as a vibration sensor or another hit sensor to sense any strike. As in the first embodiment, the target plate 1060 forms a user-visible target surface which in use faces a shooter and defines a primary impact surface. The target plate 1060 also has at least one pair of integrally formed projecting members, or top and bottom diffuser arm mounting points 1050, 1055. A diffuser fastening arm 1070 is connected or connectable behind each mounting point 1050, 1055. Each diffuser arm mounting point 1050, 1055 is designed to be wide enough to shield one diffuser fastening arm 1070 from any projectile strikes.

Each diffuser fastening arm 1070 may be integral or integrally formed as one-piece with the target plate 1060, for example, in the former case, the two may be joined by welding to be integral with each other.

Figure 27:
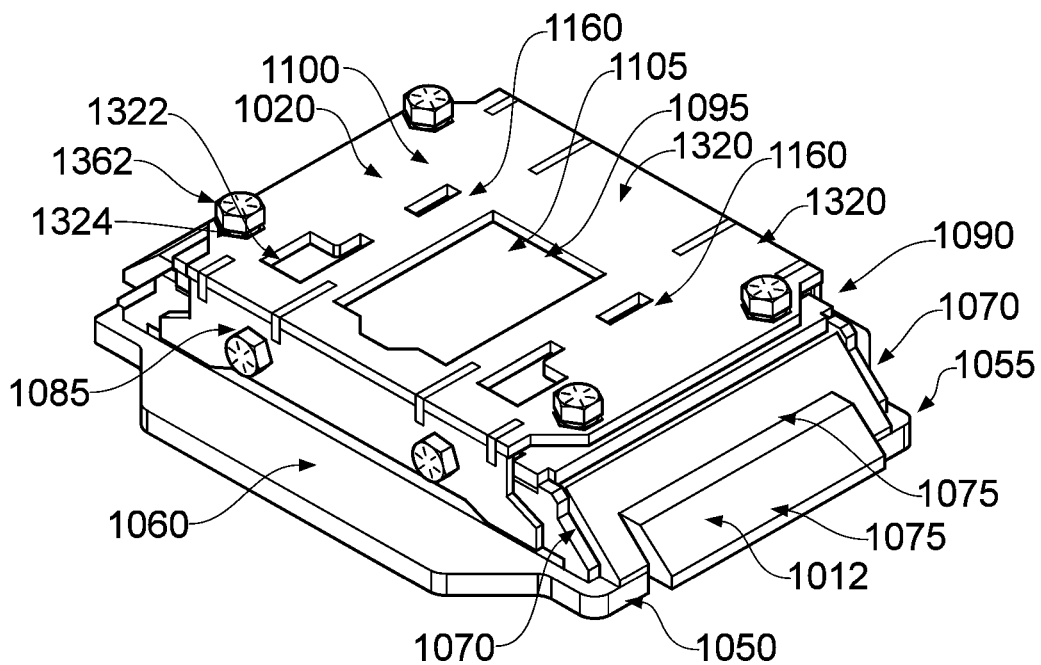
FIG. 27 back side isometric view of the illuminable shooting target body in FIG. 23, with the light-transmitting portion removed.

Each diffuser fastening arm 1070 consists of a hard metal material to protect against adjacent shrapnel impacts. It can thereby provide shielding from side impact and blast damage, along with the target side bracket mounting system 1020. One said diffuser fastening arm 1070 is a substantially planar element which extends perpendicularly or substantially perpendicularly to target plate 1060, and to any projectile vectors. The electronics housing 1095 is preferably positioned between and/or interengages the diffuser fastening arms 1070. Each pair of adjacent diffuser fastening arms 1070 provides a mounting area therebetween which is engageable with a light-transmitting portion 1012. As shown in FIG. 27, each diffuser fastening arm 1070 has at least one notch, recess or aperture 1328a in which a top-grab 1330 or rear clamping element is receivable. Additionally, each diffuser fastening arm 1070 may have a second notch 1328b or aperture in which a bottom-grab 1332 or front clamping element is receivable. Together, the top-grab 1330 and the bottom-grab 1332 form a releasable clamping element, for clamping at least one said light-transmitting portion 1012.

Figure 28:
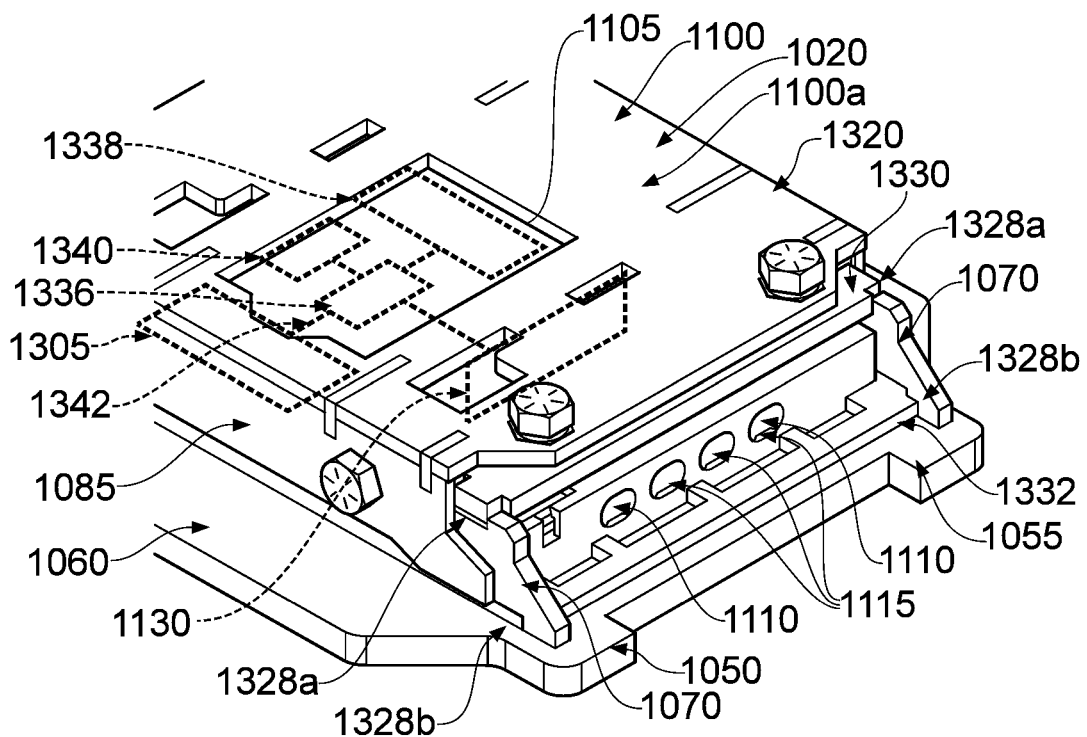
FIG. 28 back side isometric view of the illuminable shooting target body in FIG. 27, with the bracket partially removed for clarity.
Figure 29:
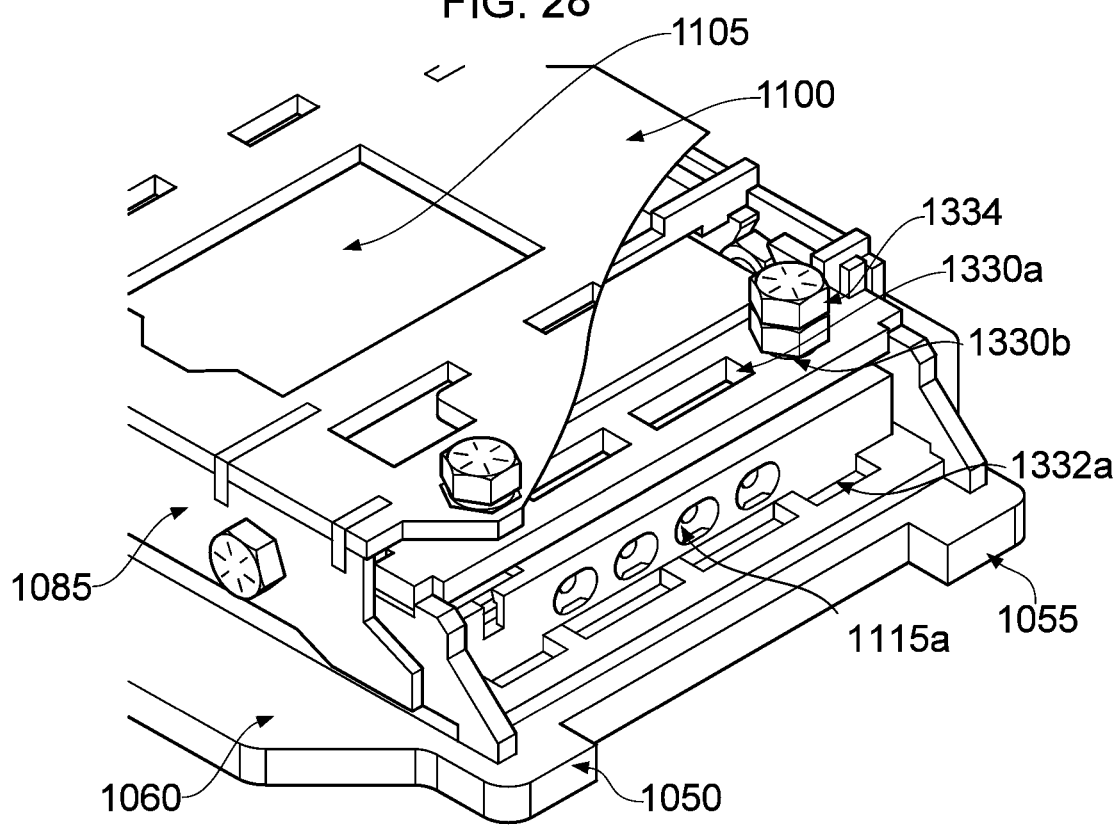
FIG. 29 isometric view of one light-transmitting portion of FIG. 23.

The top-grab 1330 is a removable elongate element, such a bar, strip, rod, pin, shaft or plate and is preferably formed from of metal. Referring to FIG. 28, the top-grab 1330 has at least one and in this case two grooves, openings, slots or apertures 1330a. Additionally, the top-grab 1330 has at least one top-grab bore 1330b of equal diameter to the at least one bracket-back bore 1324 and preferably positioned such that both bores are aligned. A fastening means 1334, such as a bolt or screw may go through at least the bracket-back bore 1324, and the top-grab bore 1330b.

The bottom-grab 1332 is also an elongate element, similar to the top-grab 1330 having at least one, and in this case, four recesses 1332*a*. The bottom-grab 1332 may be removable from the diffuser fastening arms 1070 and/or the target plate 1060.

In an alternative embodiment, there may be no bottom-grab. In a further modification to the present embodiment, either or both the top-grab and bottom-grab may have no grooves or may have protrusions, projections or teeth instead of or in addition to the grooves, slots or apertures. In a further alternative embodiment, the clamping element or means may be non-separable from the diffuser fastening arms and/or may include a spring or other means for biasing the clamping element into a specific condition.

The or each mounting area, cut out, or channel defined by the fastening arms, is designed to fasten a light-transmitting element 1012 such that it will stay affixed to the target 1005 during use, but break away when struck directly, allowing all impact debris to exit the rearward area of the target 1005.

The target or electronics housing 1095 is a supporting and protective structure for the target assembly. The target housing 1095 also provides blast damage shielding. In an alternative embodiment, the bracket may be sufficient to provide shielding, without requiring a target housing.

The electronics housing 1095 is preferably rectangular, although other shapes, such as square, polygonal, circular or "x-shaped", could be envisaged. The electronics housing 1095 is located behind the target plate 1060, and in use, within the bracket 1320. The electronics housing 1095 is preferably constructed out of a durable polymer or plastics, to allow for precision placement of components and economical manufacturing, and includes embedded dampening components that sit against the back of the target plate 1060. All electrical components are preferably housed in the electronics housing 1095. The electronics housing 1095 may be integrally formed with the target plate 1060 for durability, or may be separable from the target plate 1060, for ease of access to the electronic components.

In this case, the electronics housing 1095 has at least one and preferably a plurality of housing bores, of equal diameter to the bracket bores 1324, and both bores are coincident to and/or aligned with one another such that a quick release pin with a pull ring, or another fastening system, such as a bolt and/or a screw in this case, can lock the bracket and electronics housing together.

The electronics components housed within the electronics housing 1095 include lighting systems, at least one vibration sensor or said hit detector 1305, a programmable logic controller (PLC) 1336, power system 1338, radio and/or antenna system 1340 and wiring or inductors 1342.

The lighting systems or light-emitting element consists of one or more light emitting diodes (LEDs) 1110, a projector 1115 and a metal clad printed circuit board 1130. In this embodiment, there are at least four light-emitting diodes 1110 in the light-emitting element for each light-transmitting portion 1012.

Figure 30:
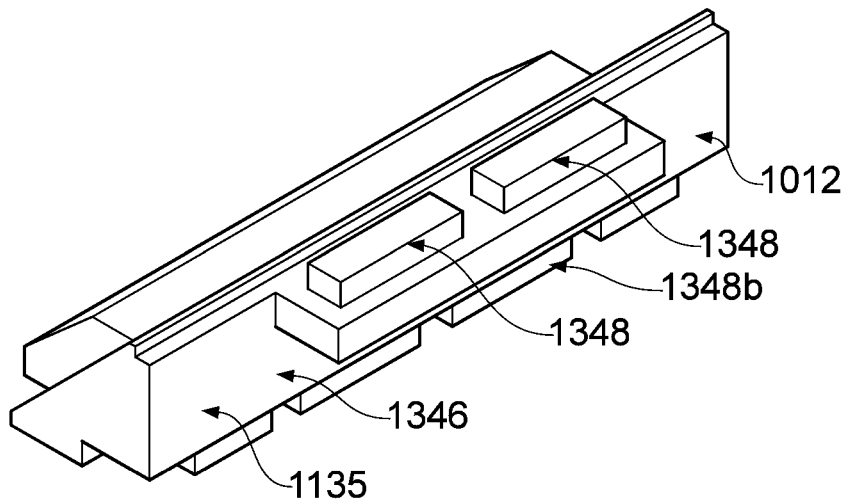
FIG. 30 side view of the light-transmitting portion of FIG. 29.
Figure 31:
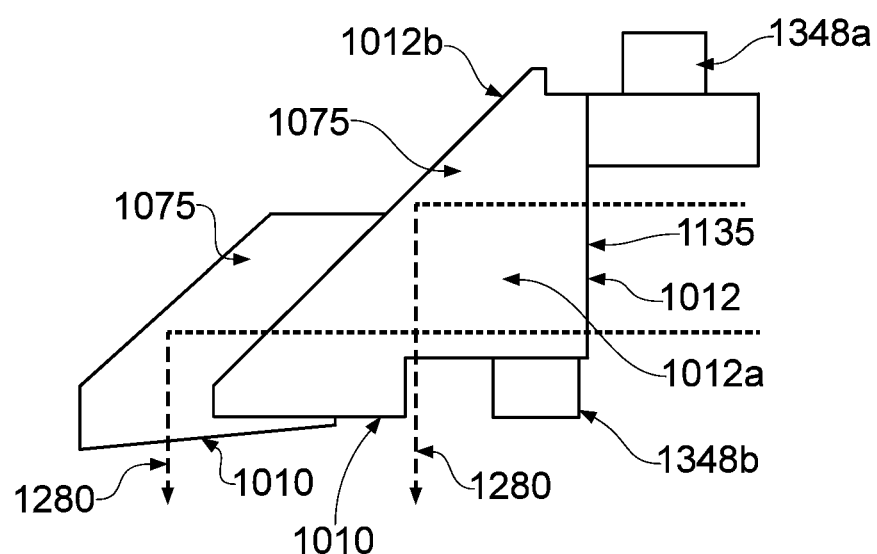

The or each light emitting diode 1110 is mounted within or behind the target plate 1060. LEDs mounted within the target plate would be embedded therein and would be sacrificial, becoming incapacitated if struck. LEDs 1110 mounted behind the target plate 1060 will face a direction parallel or substantially parallel to the face of the target plate 1060 or perpendicular to the projectile path of travel. The or each light emitting diode 1110 may be white or another colour. Optionally, there may be a plurality of light emitting diodes and the light-emitting diodes may be different colours to each other such that a range of colours may be emitted. Referring to FIG. 30, in this embodiment, the lighting source or light-emitting element 1110 projects a ray or beam of light along a light path 1280 into the light-transmitting portion 1012, whether directly or via the projector 1115, prior to entering the light-transmitting portion 1012.

Alternatively, the light emitting diodes may all be the same colour but a colour filter or filters may be interposed on the light path. In a further alternative embodiment, the light source may be a type of light other than an LED, such as a halogen light.

In a further modification to the present embodiment, the light source or light-emitting element may be located elsewhere than behind the target plate. For example, the light-emitting element may be located along the target stand. In such an alternative embodiment, the light may be conveyed by an optical fibre cable.

The projector 1115 is a supporting structure, which concentrates and directs the light directly through the self-healing diffuser or light-transmitting portion 1012. In this case the projector 1115 has four apertures 1115*a* for concentrating the light of four separate light-emitting diodes 1110, although it could also be envisaged that there are four separate projectors. The projector 1115 is preferably positioned between and interengages two adjacent diffuser fastening arms 1070, behind or within the target plate. Preferably, the projector 1115 is located between the target plate 1060 and the top-grab 1330, spaced-apart from the top-grab 1330. Additionally, the projector may also be located between the bottom-grab 1332 and the top-grab 1330.

Alternatively, the projector may be spaced-apart from the light-transmitting portion such that the projector is not positioned between both or either the top-grab and/or bottom-grab.

The metal clad printed circuit board 1130 is wired directly back to and in communication with the PLC 1336 or microprocessor.

The hit-detector 1350 or vibration sensor is preferably connected to at least the striker target plate 1060, the sensor producing an electronic signal when struck by a projectile. The hit-detector 1350 is wired to one or more onboard microprocessors or small PLCs 1336 within the electronics housing 1095. The hit-detector 1350 sends a signal back to the onboard microprocessor or PLC 1336 to then actuate the light-emitting element 1110, illumination or lighting systems programmatically. The particular signal can be tuned via software on the PLC 1336 to detect vibrations only within practical ranges, for example those typically caused by a bullet impact.

Alternatively, the primary shooting target 1005 with associated areas of illumination may include one or more hit detectors 1305 such that illuminated feedback can be localized to the area struck, such as the center-mass area, the head, or general body.

The PLC 1336 attached to each target 1005 receives the hit detection signal, processes the information, activates or deactivates respective light emitting elements 1110 according to the software instructions controlling the PLC. The PLC 1336 is also connected to the radio system to send digital and/or analog information, for example hit data, to other targets 1005 on a target field, repeaters, base stations, mobile devices and/or computers, required to operate a multi-shooting target game experience. The PLC also sends or receives processed information via the radio system 1336 or transceiver to coordinate the hit data to a central processing unit, which conveys a set of instruction as per associated software and receives information back from multiple shooting targets 1005. This software, controlled by a mobile device such as IOS and Android, provides the ability to reproduce digital game mechanics that resemble video game rules, and even mechanical steel target systems such as a dueling tree.

The power system 1338 is preferably a battery, although in an alternative arrangement, the power may be supplied by an external local power generator or the mains via an electrical outlet.

Each light-transmitting portion 1012 is an elastically deformable light-transmissible block having a user-facing portion 1010 and a body-engagement portion 1346, receivable, in this embodiment on a side of the illuminable shooting target 1005. Each light-transmitting portion 1012 provides illumination from the or the respective light-emitting elements 1110 towards the shooter. In this case, the or each light-transmitting portion 1012 is separable or removable from the target assembly which allows them to be sacrificial and easily replaceable, although in an alternative arrangement, the light-transmitting portions may not be separable. Each light-transmitting portion 1012 is formed of a diffuser element 1012a and a reflector element 1012b, which is here formed as a reflective layer. Each light-transmitting portion 1012 has at least one tooth 1348, projection or protrusion which is engageable with the or one of the grooves, slots or apertures of at least one of the top-grab 1330 and the bottom-grab 1332.

Whilst in this embodiment, there are preferably two light-transmitting portions 1012, in an alternative embodiment there may be one, three or more light-transmitting portions per shooting target.

In this arrangement, the or each tooth 1348 is integrally formed with the light-transmitting portion 1012 and as such, is made of the same polymeric material. It could be envisaged however that the tooth 1348 or teeth are made of another material, such as metals, plastics or a combination thereof. In a further alternative embodiment, the light-transmitting portion may have grooves or apertures instead of or in addition to the above-mentioned teeth, the grooves or apertures for receiving any teeth on the top-grab or bottom-grab. Preferably, one said tooth 1348 receivable in or on the top-grab 1330 are referred to as a top-tooth 1348a, whilst a tooth 1348 receivable in or on the bottom-grab 1332 is referred to as a bottom-tooth 1348b. The top-tooth 1348a is positioned on an overhanging lip which is receivable between the projector 1115 and the top-grab 1330. Preferably, the top-tooth 1348a and the bottom-tooth 1348b are co-planar or substantially coplanar, which provides additional strength to withstand an impact. However, in an alternative embodiment, the top-tooth and bottom-tooth may not be coplanar.

The diffusive element or diffuser element 1012a is forward-facing and evenly distributes light from the laterally mounted LEDs 1110 behind the target plate 1060 so that a shooter can clearly see the indicated light and color from any shooting distance. The material of the diffuser 1012a is a substance that has the built-in ability to automatically repair damage to itself through the process of reforming broken molecular bonds, or simply minimize damage and deformity with an elastic material such that when penetrated by a projectile, the body of the material will stretch and deform, then close up and partially reseal as the projectile passes through. Tear strength of the material must be sufficient for the diffuser 1012a to sustain bullet impacts. Specifically, the light-transmitting portion 1012 is made at least in part of self-healing polymer, silicon, eurethane, polyurethane, rubber, or other similar material, that includes reflective, light diffusive, and/or light transmitive properties, and therefore may be at least substantially or at least in part transparent, translucent or reflective. As in the first embodiment, the illuminated polymer or elastomer diffuser 1012a is not a primary impact surface, but may be positioned directly on or nearby, and is tethered, connected or attached wirelessly or by wire, to the primary target plate 1060 such that any strikes to the primary target plate 1060 will illuminate the diffusers 1012a.

In an alternative embodiment, the diffuser element 1012a may be fully translucent and not diffuse the light or may have a roughened surface which allows for diffusion at a front side. In a further modification to the present arrangement, the diffuser element 1012a may also be partly formed of metals in addition to the self-healing polymer and/or be a prism.

In this case, the light reflector or reflective element 1012b reflects light outwards and towards the shooter. The reflective element 1012b is a reflective coating or paint applied to at least one primary reflective side 1075 of the diffuser 1012a, angled at 45°, such that any light passing in will reflect out at 90° relative to its entry, as in a prism. As such the diffuser 1012a has a light entry side 1135 and exit side or front surface 1010 of the diffuser 1012a. In this embodiment, the diffuser element 1012a has at least two primary reflective sides 1075 and at least two front surfaces 1010. This geometry allows for a reduced use of polymeric material during manufacture. The two front surfaces 1010 of one light-transmitting portion are non-coplanar and non-parallel, although in an alternative embodiment they may be co-planar and/or parallel. As in the first embodiment, the front surfaces 1010 are secondary impact surfaces. The reflective properties of the reflector element 1012b may be formed by injection overmolding of a suitable substance, such as reflective paint or coating, over a partially or fully translucent diffuser 1012a.

Alternatively, the geometry alone of the diffuser element, in particular the primary reflective surface, may be sufficient to cause reflection as in a prism, without requiring a reflective element, paint or coating to be applied.

In an alternative embodiment, the reflective coating or paint may be applied to all sides of the diffuser 1012a with exception to an entry side 1135 and a front face 1010. This coating may be a self-healing material itself, or bond tightly enough to the diffuser's 1012a material or substrate as to follow the natural surface reforming as it heals and or reseals, either partially or fully.

Fastening the light-transmitting portion 1012 with at the top-grab 1330 keeps the light-transmitting portion 1012 in position while bullets strike and pass through. Therefore, each light-transmitting portion 1012 is held in place through a friction or interference fit provided by the mounting area, and the clamping element. Each light-transmitting portion 1012 can be quickly fixed to a target 1005 with a simple slip-on design, providing for a quick and economical replacement feature but also providing for an exceptionally strong fastening system built to withstand bullet strikes without disrupting the operation of transmitting light.

In use, a user would to start assembling the shooting target 1005 by set up the target stand in a desired location, oriented to stand upright. The stand bracket, having the two stand bracket arms, is received on or in the target stand. The stand bracket arms are in this case oriented such that the slip-on mount hooks may be inserted into the vertical slots 1160 of the bracket back 1100 and hold the bracket 1320 vertically. The target assembly needs to be assembled prior to engaging the target assembly with the slip-on mount hooks of the stand bracket arms.

To assemble the target assembly, the electrical or electronic components are inserted into and secured in the electronics or target housing 1095. The target assembly is then positioned and held by the bracket 1320. The bracket top and bottom 1085, 1090 and the target housing 1095 are aligned such that their respective bores, the bracket bore and the housing bore, are coincident to one another. A quick release pin, screw or other fastener is then inserted into the coincident holes.

The bracket holding the target assembly is then received on the stand bracket arms by inserting the slip-on mount hooks into the vertical slots 1160 on the bracket back 1100 and sliding the slip-on mount hooks vertically to mechanically lock the bracket 1320 into place.

Each light-transmitting portion 1012 can be engaged with the main body at this point or whilst assembling the target assembly. The light-transmitting portion 1012 is positioned such that the exit side 1010 is visible to the user. The bottom tooth 1348 or teeth of the light-transmitting portion 1012 are then inserted the grooves of the bottom-grab 1332, itself positioned between each projecting fastening arm 1070 of an adjacent pair of fastening arms. The top-tooth 1348*a* or top-teeth are engaged in the groove or grooves of the top-grab 1330. The top-grab 1330 is slotted into position, held by the notches on the diffuser 1012*a* fastening arms 1070. The light-transmitting portion 1012 is secured by a screw or other fastening means being inserted into one said bracket-back bore 1324 aligned with one said top-grab bore 1330*b*.

The PLC 1336 controls the metal clad printed circuit board 1130 to control the light-emitting element or light source. When the light emitting diode or diodes 1110 are turned on, a light or light beam is emitted therefrom and travels to the projector 1115. The projector 1115 conveys the light to the light-transmitting portions, where the light enters the light entry side 1135. The light is either diffused uniformly throughout the diffuser 1012*a* and/or reflected on at least the primary reflective side 1075. In either case, the light exits the light-transmitting portion 1012 via the exit side 1010 and is visible to a user.

Upon impact of a projectile thereon, the light-transmitting portion 1012 sustains minimal damage. Yon a vector or trajectory that intersects with the light-transmitting portion 1012, a bullet or projectile, will simply tunnel through and eject at a point, preferably on a back surface, leaving minimal damage that may allow a self-heal of both the polymer material and reflective paint coating. The light-transmitting portion 1012 material partially closes around the wound or hole. After a hit, the light-transmitting portion 1012 is substantially able to continue transmitting light to the user if the light-emitting element 1110 is still emitting light. Thus, the light-transmitting portion is able to withstand large forces from large caliber bullets and lasts longer than many other shooting targets 1005. In other words, optical communicability is maintained between the light-transmitting element 1012, the light-emitting element 1110 and a user, despite accommodating a projectile therein. A light pathway is maintained from the light-emitting element 1110, through the diffuser element 1012*a* via the reflector 1012*b* and through a user-facing surface 1010 of the light-transmitting element 1012.

To replace a damaged light-transmitting portion, the fastening means securing the top-grab 1330 is unfastened and the light-transmitting portion 1012 can simply be slipped-off or slid out of the mounting area, requiring very little time to replace the light-transmitting portion 1012. As each light-transmitting portion 1012 can be changed individually and each light-transmitting portion 1012 has a long life-span, this is more economical.

When the shooting target 1005 is impacted, whether the target plate 1060 or a light-transmitting portion 1012 is hit, the hit-detector 1350 sends a signal back to the onboard microprocessor or PLC 1336 to then actuate the illumination programmatically. The particular signal can be tuned via software on the PLC 1336 to detect only vibrations within practical ranges. The PLC 1336 sends a signal to the metal clad printed circuit board 1130 which controls the light-emitting element 1110. The PLC 1336 alters the output of the light-emitting element 1110 according to a pre-programmed code or software script. The output of light-emitting element 1110 and therefore the visible light-output of the exit surface 1010 of the light-transmitting portion 1012 is altered such that the light-emitting portion 1012 is turned off or on and/or changes in colour, display frequency and/or display pattern. The changes in colour can also be accompanied by another cue such as a falling plate and/or an audible cue.

All aspects of the invention are designed to operate independently as well as interact with other targets 1005 for gamified interactivity. In the dueling tree, for example, the central processing unit, or base station, on the field identifies all targets 1005 in the dueling tree configuration and provides instruction to volley possession of the target 1005 back and forth. For instance, if all targets 1005 on the left side of the tree are lit, the central processing unit on the field will tell target IDs on the right to light up if any target 1005 IDs on the left are struck. And vice versa. Therefore, the hit sensor 1305 of one target 1005 can affect or control the lighting of another target 1005, via the programmable logic controller 1336 of each target, each PLC 1330 being in two-way communication with the central processing unit. Similarly, a plate rack challenge game mechanic can be achieved by lighting up all targets 1005, then each target 1005, when struck sends hit time data to the central processing unit, while also changing the light color or on off state, and aggregating all data for competitive analysis on a mobile device.

The target assembly is disassembled by performing the above assembly steps in reverse order.

The invention claimed is:

1. An illuminable shooting target comprising:
    a body having a user-visible target surface which in use faces a shooter;
    a light-emitting element associated with the user-visible target surface;
    a light-transmitting portion which is positioned at or adjacent to the user-visible target surface and communicates with the light-emitting element to output light emitted therefrom, the light-transmitting portion having a longitudinal extent and a longitudinal edge extending along the longitudinal extent; and
    a hit detector which controls the light-emitting element in response to an impact, the light-transmitting portion at least in part elastically deforms to accommodate a projectile therein whilst maintaining communicability with the light-emitting element,
    wherein a releasable elongate clamping element extends along a majority of the longitudinal extent of the light-transmitting portion to releasably clamp the light-transmitting portion to a rear of said body;
    wherein the light-transmitting portion is inserted into and/or removed from between the clamping element and the said body in a direction which is perpendicular to the said longitudinal extent of the light-transmitting portion;

wherein the clamping element includes at least one of: one or more openings and projections, and the light-transmitting portion includes at least one of: complementary projections and openings, respectively, the one or more projections being complementarily shaped to engage with the one or more openings; and wherein the clamping element comprises a top-grab having the said one or more openings, and the light-transmitting portion comprises the said one or more projections complementarily shaped to engage with the one or more openings in the top-grab, the clamping element further comprising a bottom-grab having one or more further openings and the light-transmitting portion having one or more further projections complementarily shaped to engage with the further openings, part of the light-transmitting portion being received between the bottom-grab and the top-grab.

2. The illuminable shooting target as claimed in claim 1, wherein the light-transmitting portion has a reflector element for reflecting light received from the light-emitting element.

3. The illuminable shooting target as claimed in claim 1, wherein the top-grab and the bottom-grab are each an elongate bar or elongate plate.

4. The illuminable shooting target as claimed in claim 1, wherein the light-transmitting portion is an elastically deformable light-transmissible block having a user-facing portion and a body-engagement portion, the user-facing portion having a rear surface which is at an angle to a front surface to enable at least in part internal reflection of incident light emitted by the light-emitting element.

5. The illuminable shooting target as claimed in claim 1, wherein the light-emitting element is at or adjacent to a rear of the user-visible target surface.

6. The illuminable shooting target as claimed in claim 1, wherein the user-visible target surface defines a primary impact surface and a said light-transmitting portion is provided at at least one of: one or more corners and sides of the primary impact surface.

7. The illuminable shooting target as claimed in claim 1, further comprising a further said light-transmitting portion.

8. The illuminable shooting target as claimed in claim 1, wherein the light-transmitting portion is formed of a partially or fully translucent diffuser, and a reflector element as a layer on the diffuser.

9. The illuminable shooting target as claimed in claim 8, wherein the light-transmitting portion is made at least in part of a material selected from the group consisting of: a self-healing polymer, silicone, urethane, and polyurethane.

10. The illuminable shooting target as claimed in claim 1, wherein the said body further comprises a bracket back which extends at least in part over the clamping element.

11. The illuminable shooting target as claimed in claim 10, wherein the bracket back of the body has a bracket-back bore, the clamping element further comprises a top-grab bore alignable with the bracket-back bore, and the illuminable shooting target further comprises a fastener which engages with the bracket-back bore and the top-grab bore to provide a releasable engagement between the clamping element and the body of the illuminable shooting target.

12. The illuminable shooting target as claimed in claim 1, wherein the user-visible target surface has at least one light-transmitting-portion recess in a perimeter edge thereof, wherein the light-transmitting portion is at least partly aligned with the light-transmitting-portion recess and outputs light through the light-transmitting-portion recess.

* * * * *